US007117165B1

(12) United States Patent
Adams et al.

(10) Patent No.: US 7,117,165 B1
(45) Date of Patent: Oct. 3, 2006

(54) OPERATING RESOURCE MANAGEMENT SYSTEM

(75) Inventors: Norman Adams, Sunnyvale, CA (US); Marc Brown, Palo Alto, CA (US); Brian Carlstrom, Santa Clara, CA (US); Brian Elkin, Sunnyvale, CA (US); Paul Hegarty, Fremont, CA (US); Guy Haskin, Sunnyvale, CA (US); Boris Putanec, Menlo Park, CA (US)

(73) Assignee: Ariba, Inc., Sunnyvale, CA (US)

( * ) Notice: Subject to any disclaimer, the term of this patent is extended or adjusted under 35 U.S.C. 154(b) by 0 days.

(21) Appl. No.: 09/429,758

(22) Filed: Oct. 28, 1999

Related U.S. Application Data

(63) Continuation of application No. PCT/US98/08407, filed on Apr. 27, 1998.

(60) Provisional application No. 60/044,372, filed on Apr. 28, 1997.

(51) Int. Cl.
G06F 17/60 (2006.01)

(52) U.S. Cl. ............... 705/26; 705/8; 705/10; 705/39; 705/40; 705/64; 705/79

(58) Field of Classification Search .......... 705/26, 705/27
See application file for complete search history.

(56) References Cited

U.S. PATENT DOCUMENTS

| 3,899,775 | A | 8/1975 | Larson ............... 340/172.5 |
| 4,774,663 | A | 9/1988 | Musmanno et al. ...... 364/408 |
| 4,796,292 | A | 1/1989 | Thomas ................ 379/91 |
| 4,799,156 | A | 1/1989 | Shavit et al. ............ 364/401 |
| 4,812,994 | A | 3/1989 | Taylor et al. ........... 705/400 |
| 4,897,867 | A | 1/1990 | Foster et al. .......... 379/93.12 |
| 4,947,028 | A | 8/1990 | Gorog ................. 235/381 |
| 4,951,196 | A | 8/1990 | Jackson .............. 364/401 |
| 4,984,155 | A | 1/1991 | Geier et al. ........... 364/401 |
| 4,992,940 | A | 2/1991 | Dworkin ............. 364/401 |
| 4,999,806 | A | 3/1991 | Chernow et al. |
| 5,021,953 | A | 6/1991 | Webber et al. ........ 364/407 |
| 5,063,506 | A | 11/1991 | Brockwell et al. ...... 364/402 |
| 5,189,608 | A | 2/1993 | Lyons et al. |

(Continued)

FOREIGN PATENT DOCUMENTS

JP   4247567 A   9/1992

OTHER PUBLICATIONS

Hollander et al. Accounting, Information Technology and Business Solutions, Copyright 1996, pp. 266-267, 3 pages.*

(Continued)

*Primary Examiner*—Wynn W. Coggins
*Assistant Examiner*—Jaime E. Zurita
(74) *Attorney, Agent, or Firm*—Blakely, Sokoloff, Taylor & Zafman LLP

(57) ABSTRACT

A software system efficiently procures operating resources within an enterprise. A requisition record generating module generates a requisition record for a requisition. The requisition record indicates at least an operating resource that a requestor desires to purchase. The requisition record generating module generates the requisition record responsive to a combination of input by a requestor and operating resource information in an operating resource information database. An approval path determining module. responsive to the requisition record and to approval rules in an approval rules database, determines an approval path for the requisition record, among various ones of a plurality of possible approvers, required to approve the requisition record. An approval path handling module guides the requisition record along the determined approval path, and the approval path handling module generates a global approval indication in response to the requisition record successfully traversing the approval path.

45 Claims, 8 Drawing Sheets

U.S. PATENT DOCUMENTS

| | | | |
|---|---|---|---|
| 5,224,034 A | 6/1993 | Katz et al. | 364/401 |
| 5,270,922 A | 12/1993 | Higgins | 364/408 |
| 5,315,504 A * | 5/1994 | Lemble | 360/400 |
| 5,319,542 A * | 6/1994 | King, Jr. et al. | 364/401 |
| 5,355,474 A | 10/1994 | Thuraisngham et al. | 395/600 |
| 5,361,199 A | 11/1994 | Shoquist et al. | 364/401 |
| 5,455,406 A | 10/1995 | Terashima et al. | 235/379 |
| 5,465,206 A | 11/1995 | Hilt et al. | 364/406 |
| 5,475,585 A | 12/1995 | Bush | 364/401 |
| 5,504,893 A | 4/1996 | Kawashima et al. | 395/600 |
| 5,515,268 A | 5/1996 | Yoda | 364/401 |
| 5,528,490 A | 6/1996 | Hill | 364/403 |
| 5,544,040 A | 8/1996 | Gerbaulet | 705/26 |
| 5,557,518 A | 9/1996 | Rosen | 364/408 |
| 5,581,691 A | 12/1996 | Hsu et al. | |
| 5,592,375 A | 1/1997 | Salmon et al. | 705/7 |
| 5,592,378 A | 1/1997 | Cameron et al. | 705/27 |
| 5,594,791 A | 1/1997 | Szlam et al. | |
| 5,596,744 A | 1/1997 | Dao et al. | |
| 5,615,123 A | 3/1997 | Davidson et al. | |
| 5,623,660 A | 4/1997 | Josephson | 395/609 |
| 5,666,493 A | 9/1997 | Wojcik et al. | 705/26 |
| 5,694,551 A | 12/1997 | Doyle et al. | 705/26 |
| 5,721,832 A | 2/1998 | Westrope et al. | 705/27 |
| 5,758,327 A * | 5/1998 | Gardner et al. | 705/26 |
| 5,758,329 A | 5/1998 | Wojcik et al. | 705/28 |
| 5,799,289 A | 8/1998 | Fukushima et al. | 705/400 |
| 5,808,894 A | 9/1998 | Wiens et al. | 364/479.01 |
| 5,970,475 A | 10/1999 | Barnes et al. | 705/27 |

OTHER PUBLICATIONS

Kimberly, Paul, Electronic Data Interchange, pp. 110-113, 3 pages.*
Dan Cotto-Thorner, Google newsgroup entry "BCOP and EDI", posted on Jul. 19, 1996, downloaded from the Internet on Aug. 3, 2004.*
Business Edditors, ELEKOM unveils electronic commerce solution for corporate procurement, Mar. 13, 1997, downloaded form DIALOG, on the Internet Aug. 6, 2004.*
Internet Purchasing Roundtable, Supplyworks, author unknown, Mar. 21, 1997.*
Borthick, Roth, EDI reengineering business processes, Management Accounting, Montable, Oct. 1993, vol. 75, Iss. 4, p. 32, 6 pages. Downloaded from PROQUEST on the Internet, Aug. 20, 2004.*
Singhivi, Reingineer the payables process, Management Accounting, Montvale, Mar. 1995, vol. 76, Iss. 9, p. 46, 5 pages. Downloaded from PROQUEST on the Internet, Aug. 20, 2004.*
Cohn, Michael, What's new with Old Apps? Acccounting Technology, Boston, Jun. 1995, vol. 11, Iss. 5, p. 55, 15 pages. Downloaded from PROQUEST on the Internet, Aug. 20, 2004.*
Actra details e-commerce plans, CNET news.com staff. Apr. 16, 1997, downloaded from the Internet on Aug. 20, 2004, 3 pages.*
Morgan, Business Process re-engineering: can it help finance managers? Management Accounting, London, Sep. 1995 vol. 73, Iss. 8, p. 20, 6 pages. Downloaded from PROQUEST on the Internet, Aug. 20, 2004.*
Barr, Stephen, Advantage AETNA, CFO, Boston, Nov. 1996, vol. 12, Iss. 11, p. 35, 4 pages. Downloaded from PROQUEST on the Internet, Aug. 20, 2004.*
Mann, Paul, PR Newswire, Renaissance CS version 3.1 released by Ross Systems. Downloaded from PROQUEST on the Internet, Aug. 20, 2004.*
SAP Australia and New Zealand [SAPIENT College] R/3 Release 3.0 Training (Improving Business Results Through Training http://www.sap.com/australia/sapient/customer/53/5307/desc.htm 7 pages.
Microsoft Press Pass Microsoft Announces Implementation of SAP's Human Resources Solution http://www.microsoft.com/corpinfo/press/1997/May 97/SAPHRpr.htm 2 pages.
SAP AG [Press Information Center] "SAP and Aspect Team Up to Reduce Manufacturers' Procurement Costs and Time to Market" http://www.sap.com/press/de 02 97.htm Press Releases Feb.
SAP AG [SAP Business Information Warehouse Information Center] "SAP Business Information Warehouse-Functionality" http://www.sap.com/products/biw/biw func.htm 2 pages.
SAP Business Information Warehouse Technology Copyright 1997 SAP AG. All rights reserved, 22 pages.
SAP " Direct Link Integrated Web-based Catalog and Purchase Requisition System" Development & Technology. 2 pages.
Written by Technology Marketing, SAP AG "R/3® System Benefits of the Business Framework" Copyright 1997 SAP AG. All rights reserved.
SAP "Business Information Warehouse A ready-to-go data warehouse for R/3, complete with integrated business know-how" Copyright 1997 SAP AG. All rights reserved. 13 pages.
Nelson Matthew "Commerce One Inks Integration Deals with SAP, Microsoft" Info World Electric (Info Whttp://www.infoworld.com/cgi-bin/displayShow.pl?971210.icommerce1.htm Mar. 23, 1998, 2 pages.
Fisher Technology Group "CornerStone, A "Net" Solution for Both Buying and Selling Organizations" http://www.ftechg.com/stone.html, 7 pages.
ProcureNet http://www.procurenet.com/features.htm.
http://www.ftechg.com/product.html "Products and Services" Web Commerce Solutions Copyright 1997 Fisher Technology Group, 2 pages.
http://www.commerceone.com/products/sub).htm "The C-1 Commerce Chain" Commerce One: Products. 8 pages.
IBM Fisher Technology Group (to Market Commerce Solutions) "Network Computing" http://www.internet.ibm.com/new/2af2.html Sep. 9, 1997.
Andrews, Whit "E-Commerce Firm Bets On Software for Buying, Not Selling" http://www.internetworld.com/print.../11/17/industry/19971117-firm.html, Nov. 17, 1997.
Strohecker, James & Berkowitz, Todd Connect Introduces Purchasestream: Internet-Based Application Software To Streamline Corporate Purchasing. http://www.connectinc.com/whatsnew/pstream.htm, 5 pages.
http://www.connectinc.com/products/QS catalogmgmt.html Quickstart for OrderStream Catalog Management, 1 page.
Berst, Jesse "Business-to-Business E-Commerce Poised for Growth" Jesse Berst's Anchor Desk, your source of tech intelligence. http://www.zdnet.com.au/anchordesk/story/story 1003.html. Jun. 16, 1997. 2 pages.
Phil's Pretty Good Software Presents Pretty Good (tm) Privacy Public Key Encryption for the Masses, PGP(tm) User's Guide vol.11: Special Topics by Phillip Zimmermann, Revised 11 Oct. 94.
PCT Notification of Transmittal of International Search Report for PCT Counterpart Application No. PCT/US98/08407 Containing International Search Report, 7 pgs. (Sept. 4, 1998).
Patent Cooperation Treaty's Written Opinion for International application No. PCT/US98/08407, dated Aug. 23, 1999, 7 pgs.
PCT Notification of Transmittal of International Preliminary Examination Report for PCT Counterpart Application No. PCT/US98/08407 Containing International Preliminary Report, 8 pgs. (Nov. 18, 1999).
Patent Abstract of Japan, vol. 12, No. 401, Pub. No. 63141176, Pub. Date Jun. 13, 1988.
Patent Abstract of Japan, vol. 096, No. 003, Pub. No. 07295901, Pub. Date Nov. 10, 1995.
"Electronic Document, " IBM Technical Disclosure Bulletin, XP000441554, vol. 37, No. 3, pp. 489-490 (Mar. 1994) only p. 489-p. 490 is missing.
Judith Bayard Cushing, "Computational Proxies: An Object-based Infrastructure for Computational Science," UMI Dissertation Services, www.umi.com, pp. ii-250 (Apr. 1995).
David Linthicum, "EOF- a Next Step for C/S Apps for Nextstep Using Enterprise Object Framework, the Newest Weapon in Nextstep's Development Arsenal," DBMS (Database & Client/Server Solutions), vol. 8, No. 4, pp. 26, 28, and 102 (Apr. 1995).

"Soft Notes: What's Next?," DBMS (Database & Client/Server Solutions), vol. 8, No. 1, pp. 86 (Jan. 1995).

Shell Haffner, "Multimedia and the X Terminal," Internetwork, vol. 5, No. 9 pp. S8 (Sept. 1994).

John P. Burke, "Product Watch: Universal Translator," HP Professional, vol. 7, No. 9, p. 12 (Sept. 1993).

Alan Radding, "Five Types of Tools Get Data from Legacy Systems," Software Magazine, Jan. Special Edition, vol. 13, No. 2, pp. 31-34, 40-41 (Jan. 1993).

"Working Up to a Warehouse," Communications Week (The Networking Newspaper), www.commweek.com (Jan. 20, 1997).

* cited by examiner

OPERATING RESOURCE MANAGEMENT SYSTEM

CROSS-REFERENCE TO RELATED APPLICATIONS

The present application claims priority from provisional application No. 60/044,372 filed Apr. 28, 1997 and PCT Application No. PCT/US098/08407, filed Apr. 27, 1998.

TECHNICAL FIELD

The present invention is a software system for procurement of operating resources and, more particularly, is a software system that automates the cycle of operating resource acquisition.

BACKGROUND

Today, operating resources account for as much as a third of a sales dollar in the typical Fortune 1000 company. Nearly 95 percent of all goods and services purchased by corporations are done so through paper-based processes. Predominant use of paper-based buying is evidence that legacy business-to-business electronic commerce systems do not provide a solution for the bulk of corporate buying processes. Research indicates that a cost savings of 5 percent in operating resource goods and services cost will commonly result in a 28 percent increase in a company's profits.

Traditionally, methods of purchasing operating sources (e.g., industrial supplies, office supplies and other non-production supplies) are extremely fragmented and, thus, inefficient. What is desired is an integrated, enterprise-wide solution.

SUMMARY

With the present invention, electronic automation, consolidation and leveraged buying through operations resource management (ORM) present a significant opportunity for companies to lower costs, and thereby dramatically enhance the bottom line.

Operating resource management replaces the traditional, fragmented methods of purchasing operating resources. Through new technology—in one embodiment, namely intranets, extranets and Java™—operating resource management supersedes decades of inefficiency with a consolidated corporate electronic commerce system, to fully capture economies of scale and leverage supplier relationships. The operating resource management system of the present invention provides at least three key benefits:

Automation of the entire acquisition cycle by incorporating all of the functions that make up the purchasing process, from request through payment.

Reduced operating resources costs through economies of scale and facilitation of a shift in purchasing professionals' roles from tactical transaction processing to strategic supply-chain management.

Leverage of existing enterprise systems and electronic commerce systems through easy linkage to existing data sources, as well as suppliers' electronic commerce systems.

DETAILED DESCRIPTION OF THE PREFERRED EMBODIMENT

In one embodiment, the operating resource management system in accordance with the invention is a suite of software modules that automates the purchasing of goods and services within a corporation. Preferably, some of the modules operate on a server computer of a network and others of the modules operate with the system of the present invention, a company can reduce the cost of transactions and increase overall productivity, with direct benefit to the bottom line.

Some key features of the system are:

Walk-up User Interface on Any "Desktop" in the Company—The user interface makes the product accessible to employees with little or no training, helping and guiding the employee through the requisitioning process. Use of the system need not be limited to a select purchasing group.

Ubiquitous and Easy Information Access for All Employees—Requesters and approvers alike can see the current state of any of their requisitions at any time and, thus, are always kept in the loop when something changes about their requisition.

Authenticated Approval Flow—The system enforces the corporation's business rules and validates requisitions, ensuring accurate and complete data.

Adapters For Integrating with the Enterprise—The system provides adapters to integrate the system into legacy enterprise data sources such as ERPs, Human Resource Management Systems (HRMSs), Email systems and directory services.

Extensibility and Flexibility—The system provides complete flexibility in describing the data fields and business rules of each individual company.

Figure 1:
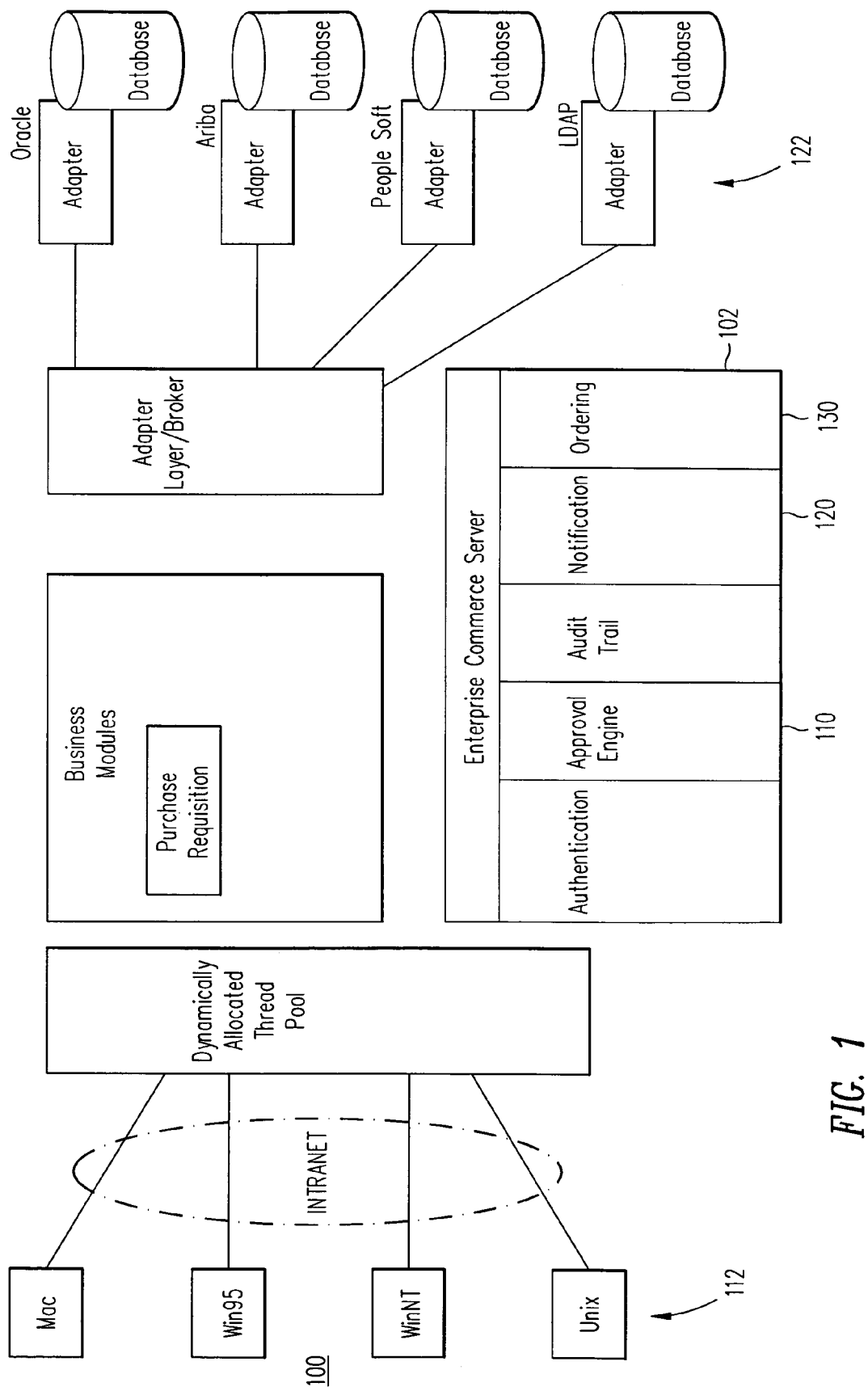
FIG. 1 shows the engineering architecture of an embodiment of the invention.

Referring to FIG. 1, in the embodiment 100 shown therein, a key module is an Enterprise Commerce Server 102, which includes Intranet application server software, preferably written in Java. A set of associated client-side software applications are also preferably written in Java. The Java client software 112 preferably runs in a Web browser (or, alternatively, is accessible via the web browser), on every desktop (shown in FIG. 1 as "Mac", "Win95", "WinNT" and "Unix"), and provides the user interface for creating and approving requisitions. The Java server software 102 preferably runs on a single shared machine, and provides "back-end" services.

Supplementing the Enterprise Commerce Server 102 are a number of Adapters 122, which integrate the system 100 into legacy enterprise data sources such as ERPs, HRMSs, E-mail systems and directory services. The system design is modular, allowing for any number of adapters to be plugged in without requiring revisions to the Enterprise Commerce Server software 102.

In practice, the system in accordance with the invention is easy to use. The system is accessible both to infrequent users, people who buy something only once or twice a year, and frequent users, purchasing agents, administrators, and others who will use the system nearly daily.

Figure 2:
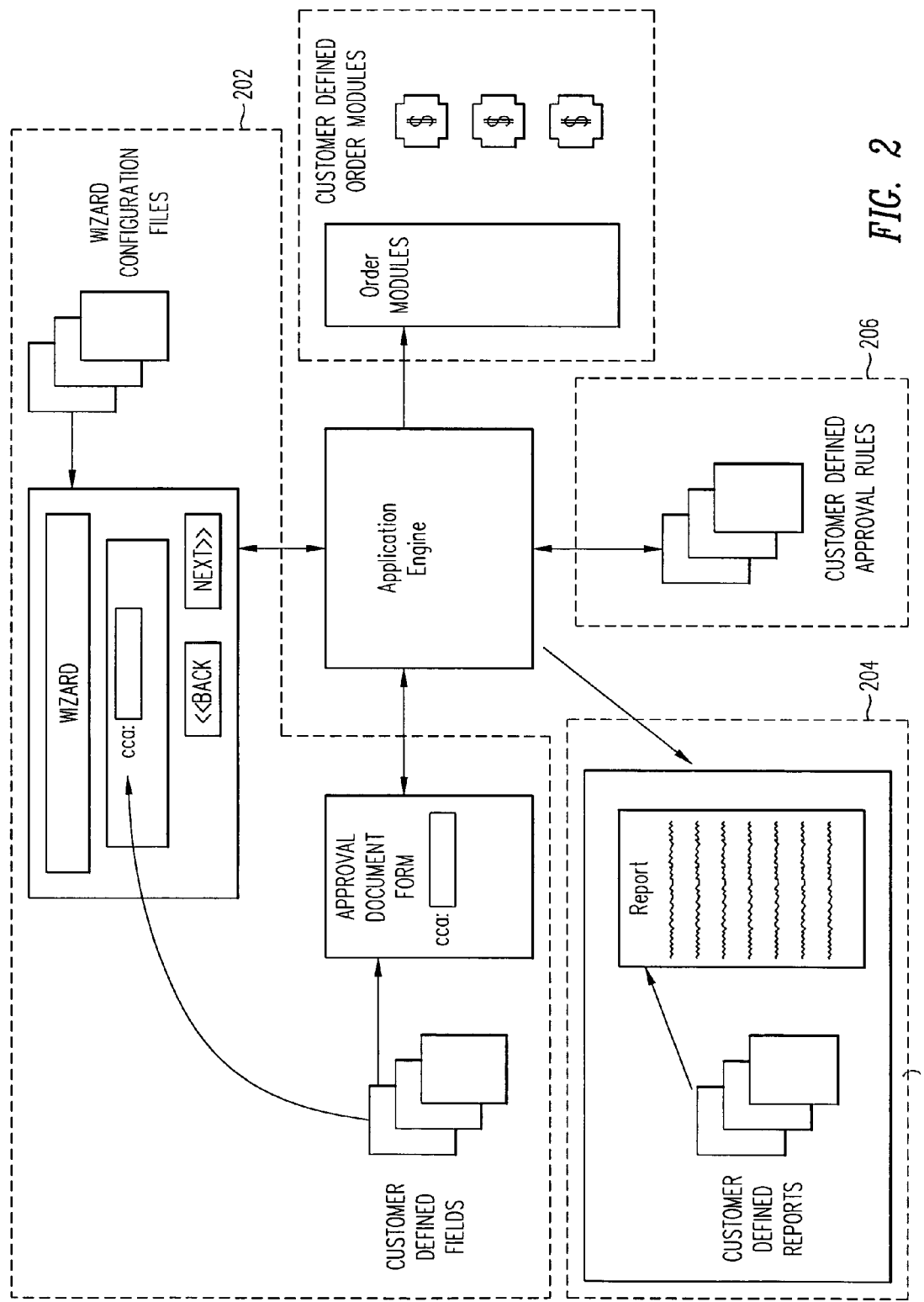
FIG. 2 shows the extensibility architecture of an embodiment of the invention.

Most users of the system will be requisitioners: employees who need to buy something. Most of these requisitioners are casual users will enter requisitions, via the client software 112, using a requisition wizard. FIG. 2 is a system diagram that shows generally how functionality (particularly functionality that can be extracted for a particular implementation) is apportioned in one embodiment of the system. Reference numeral 202 designates the requisition wizard module.

Figure 3A:
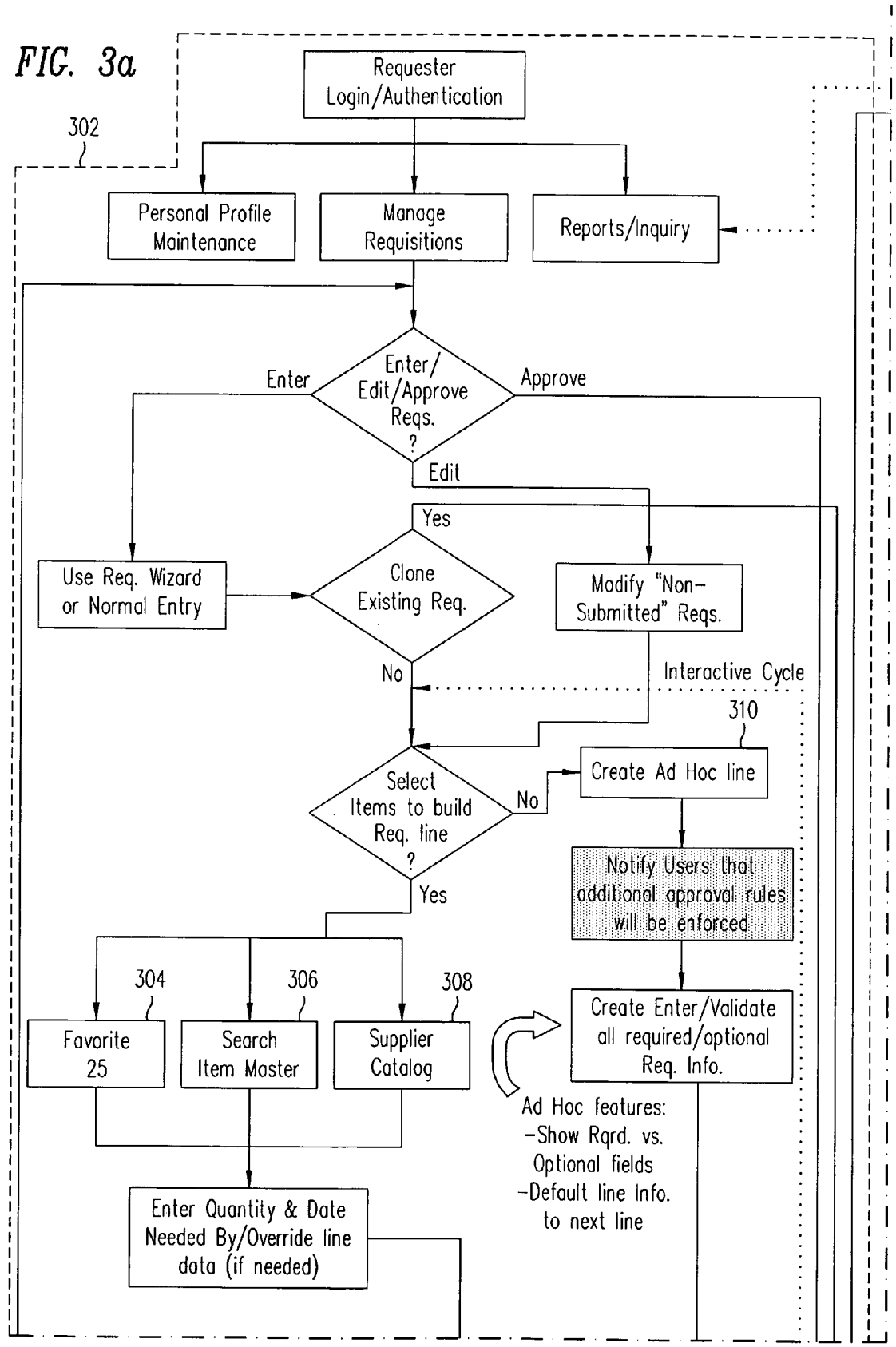
FIG. 3 shows the procurement process flow of an embodiment of the invention.
Figure 3B:
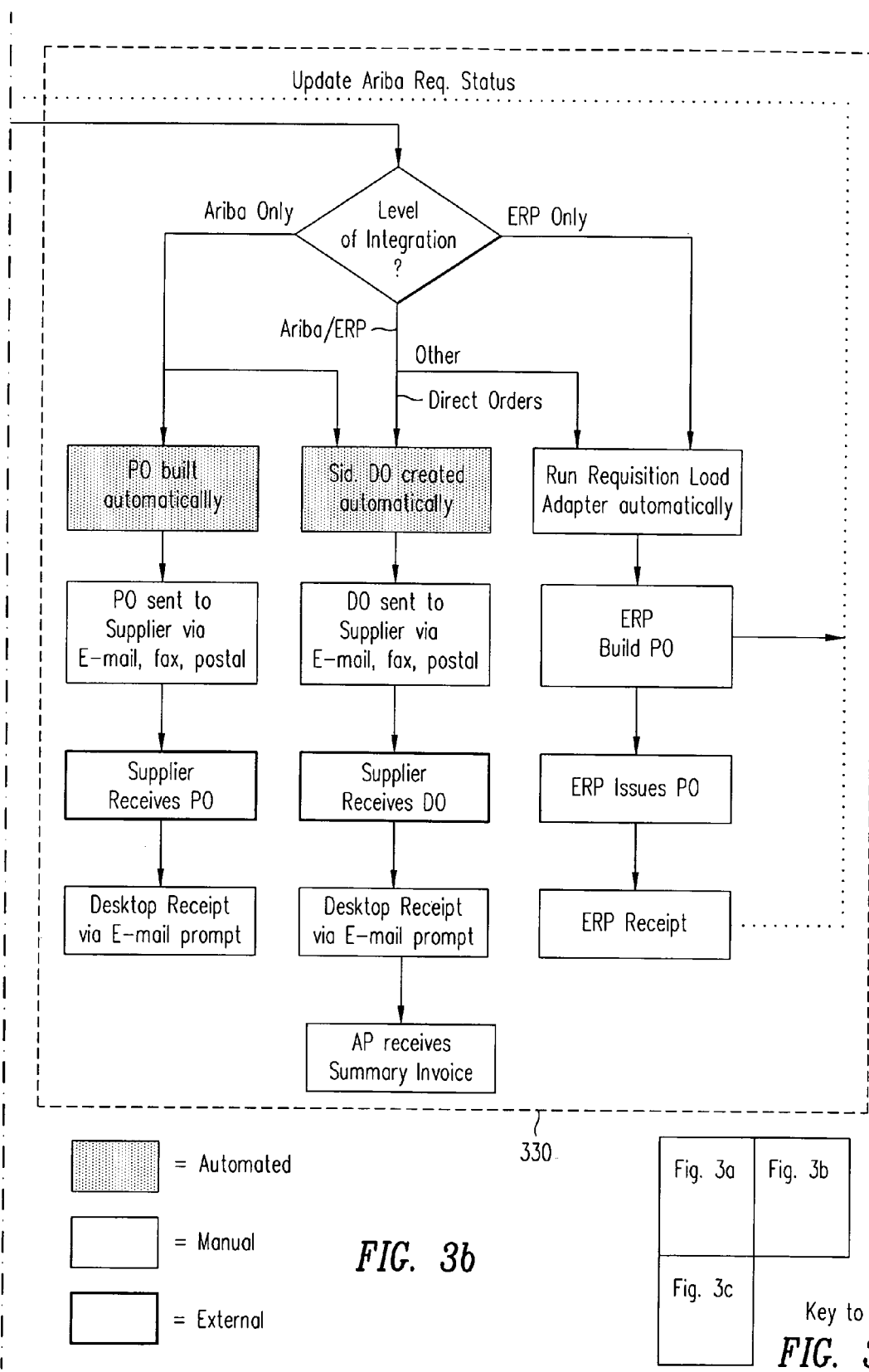
Figure 3C:
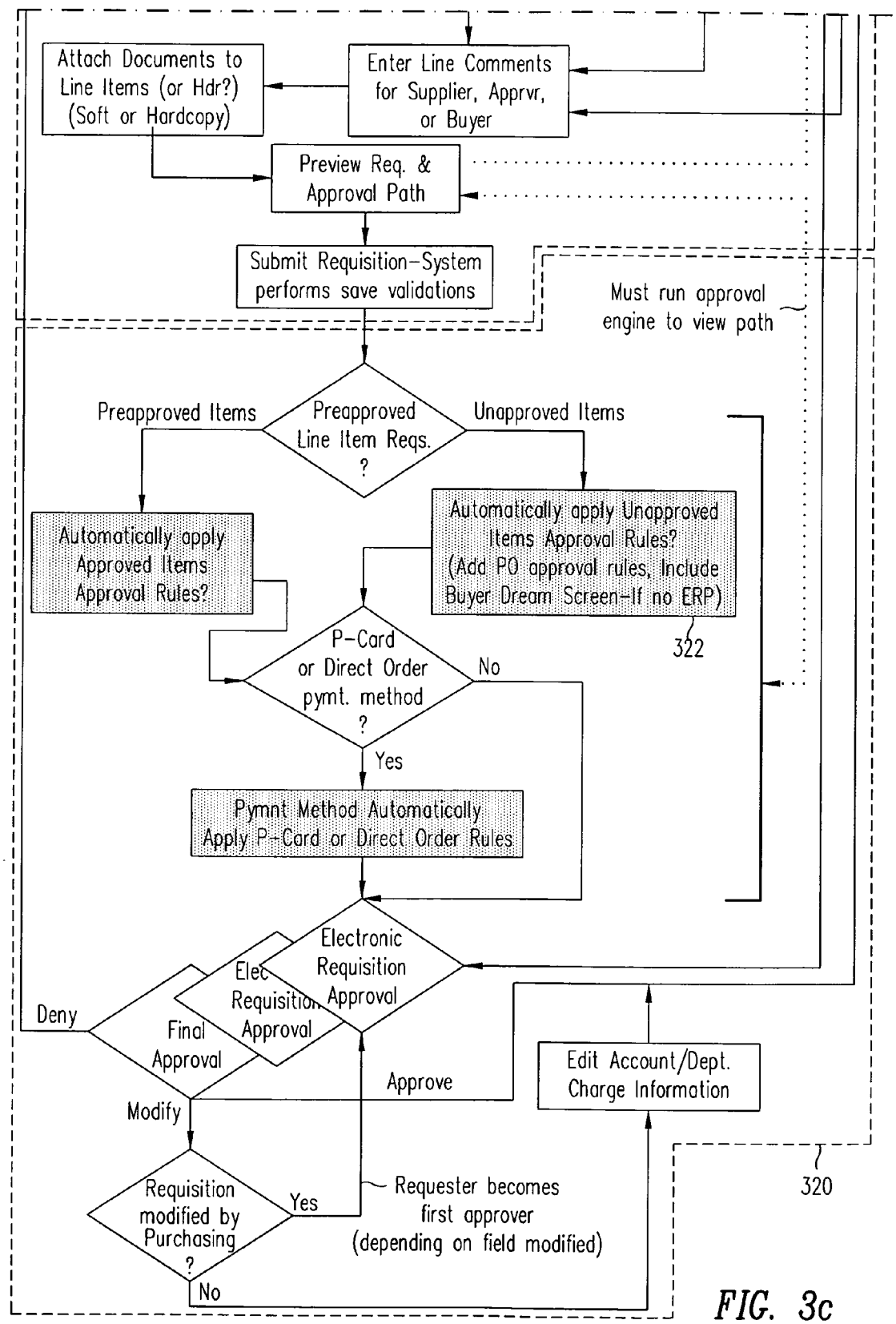

FIG. 3 is a flowchart that shows how a requisition is processed in a typical embodiment, from requisition creation to approval, to receipt of requisitioned goods/services, and to reconciliation. In FIG. 3, the reference numeral 302 designates process steps associated with creating a requisition.

Figure 4:
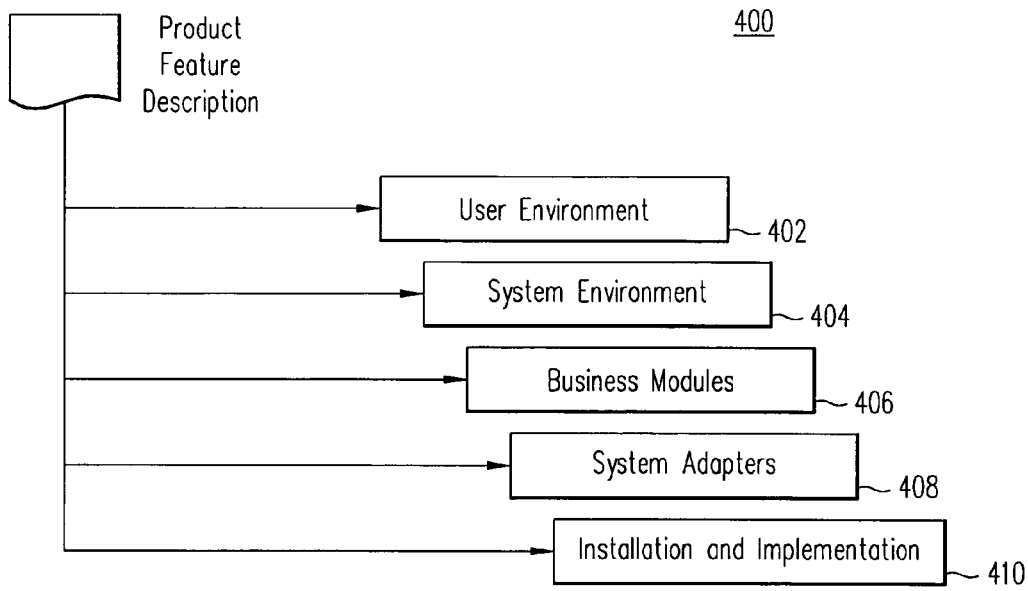
FIG. 4 shows the product feature description of an embodiment of the invention.

FIG. 4 is a top-level "product feature" description of an embodiment of the invention, while FIGS. 5 to 9 are diagrams that show the product features at a more detailed level. As can be seen from FIG. 5, the wizard software is within the "requisitions" portion 502 of the user environment 500.

The wizard 202, 302 "walks" an employee through a number of questions to guide him through the process of making a purchase. For example:

What do you want to buy today?

Generally, the first question is "what do you want to buy today?" The wizard 202, 302 offers several ways to find the answer, always encouraging employees to choose from approved items. Perhaps the employee will just choose an item from a list of his own personal favorite frequently-ordered items 304. Or perhaps he will be able find an appropriate item by searching through the product information database 306. Or perhaps he will find the item by looking through a number of approved on-line catalogs 308. (In one embodiment, the system supports such on-line catalogs, but does not itself include any catalog authoring tools.)

Preferably, only as a last resort will the wizard prompt the employee to type in the name of a supplier and part explicitly (310). Entering such ad-hoc items, items that are not in the list of approved items, will typically trigger new approval rules. For example, the approval rules of many companies will cause the Purchasing Department to be put into the approval loop at this point, to require a Purchasing Agent to decide whether to approve the new item. Because ad-hoc entry usually involves additional overhead, the wizard guides the employee through the process in such a way as to avoid ad-hoc entry whenever possible.

Who is going to pay for this item?

Another important part of the requisition is the accounting information: who will be paying for the item. The accounting structure typically varies from company to company, be it Division, Department, Account, or Project. The wizard can be configured to display and ask for different accounting fields for each company, helping to ensure that the employee will always be presented with choices that are relevant and appropriate.

The wizard continues in this vein, asking questions and gathering other data about payment, billing, shipping, and the like. Throughout the process, the emphasis is on browsing and selecting, rather than typing, on channeling the employee toward standard answers, and on generating error-free requisitions.

Any employee who handles a requisition, be it requester or approver, can add commentary or attach documents to the requisition. The ability to comment and explain can go a long way toward maintaining alignment, making requisitions understandable to approvers, allow approvers to provide feedback to requesters, and help approvers make a decision about whether to approve the request.

Figure 5:
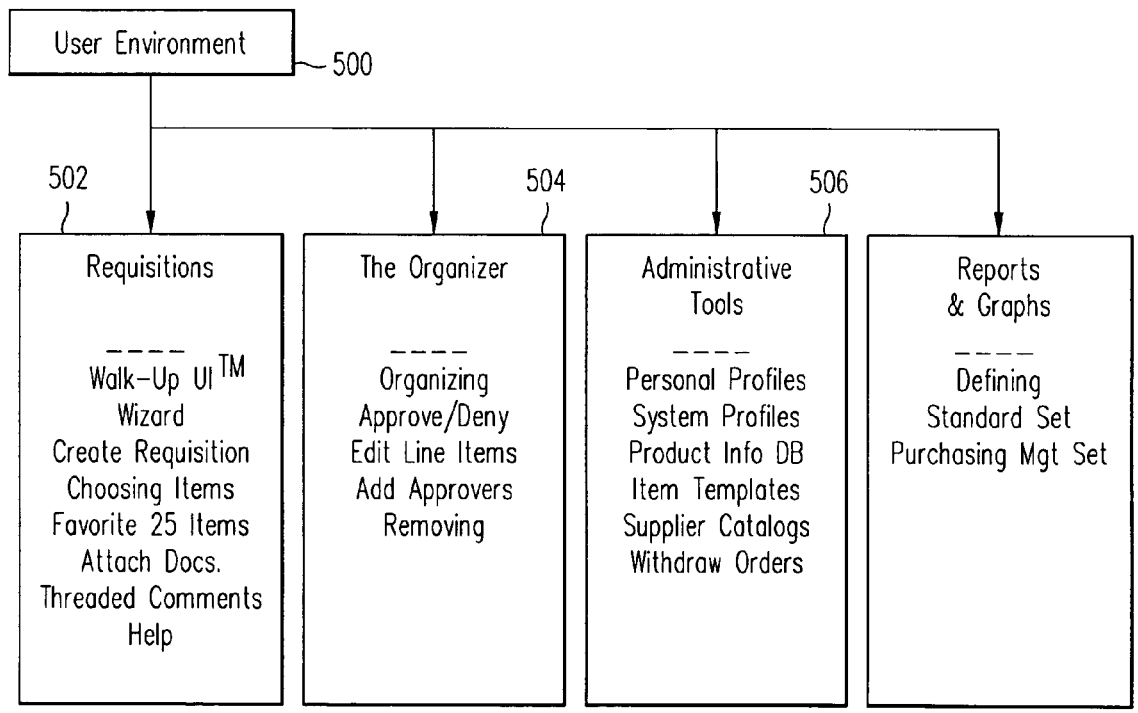
FIG. 5 shows the user environment features of an embodiment of the invention.
Figure 6:
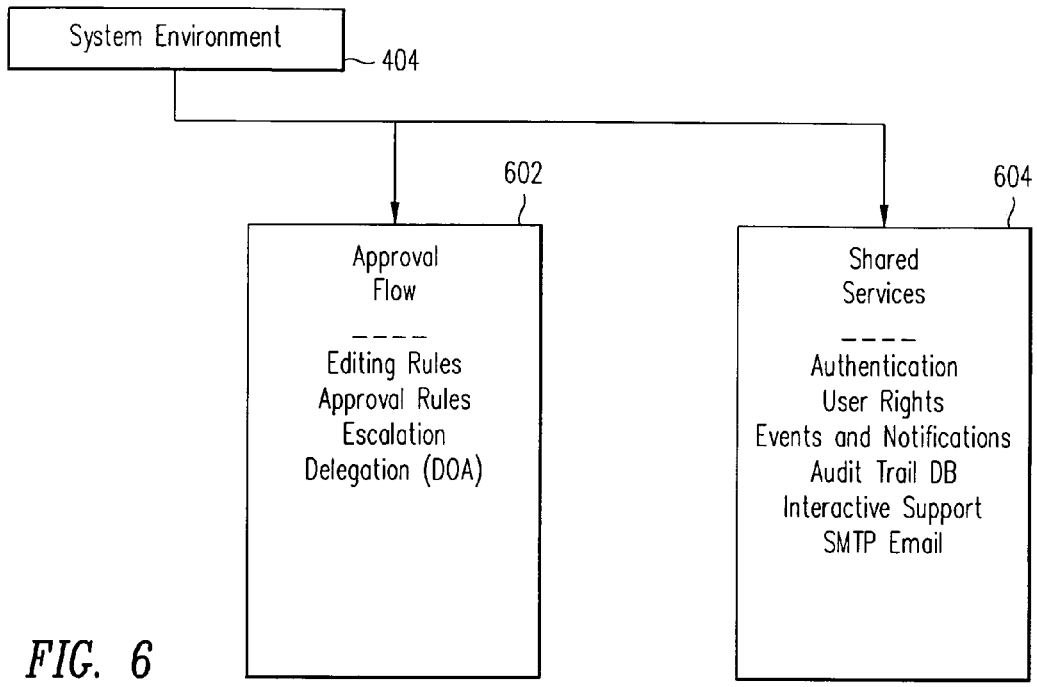
FIG. 6 shows the system environment features of an embodiment of the invention.
Figure 7:
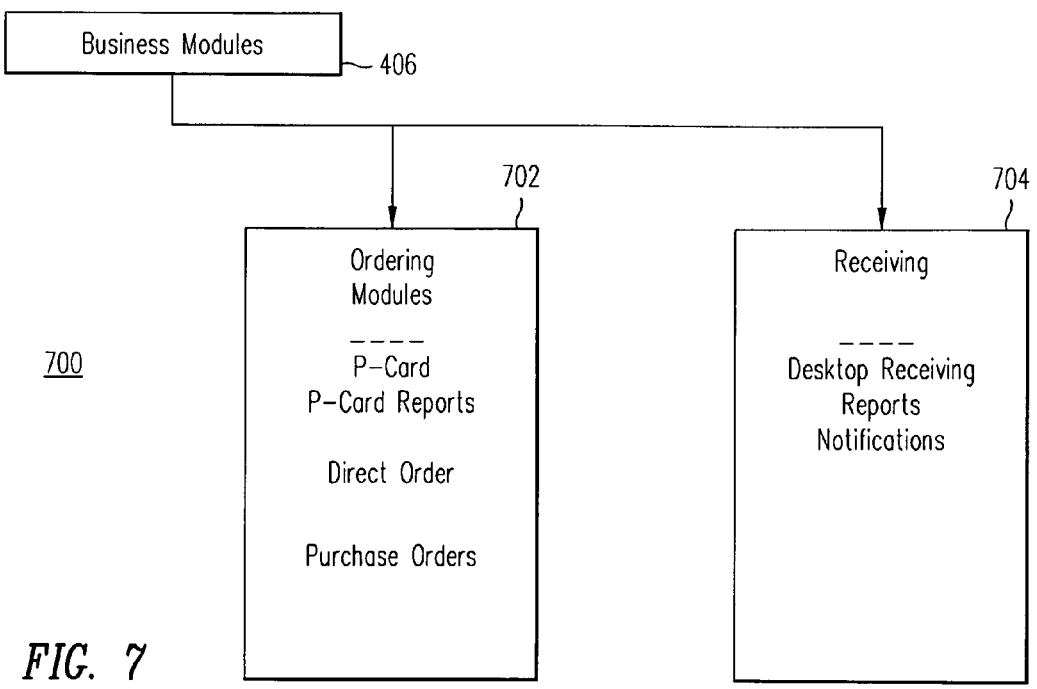
FIG. 7 shows the business modules included in an embodiment of the invention.
Figure 8:
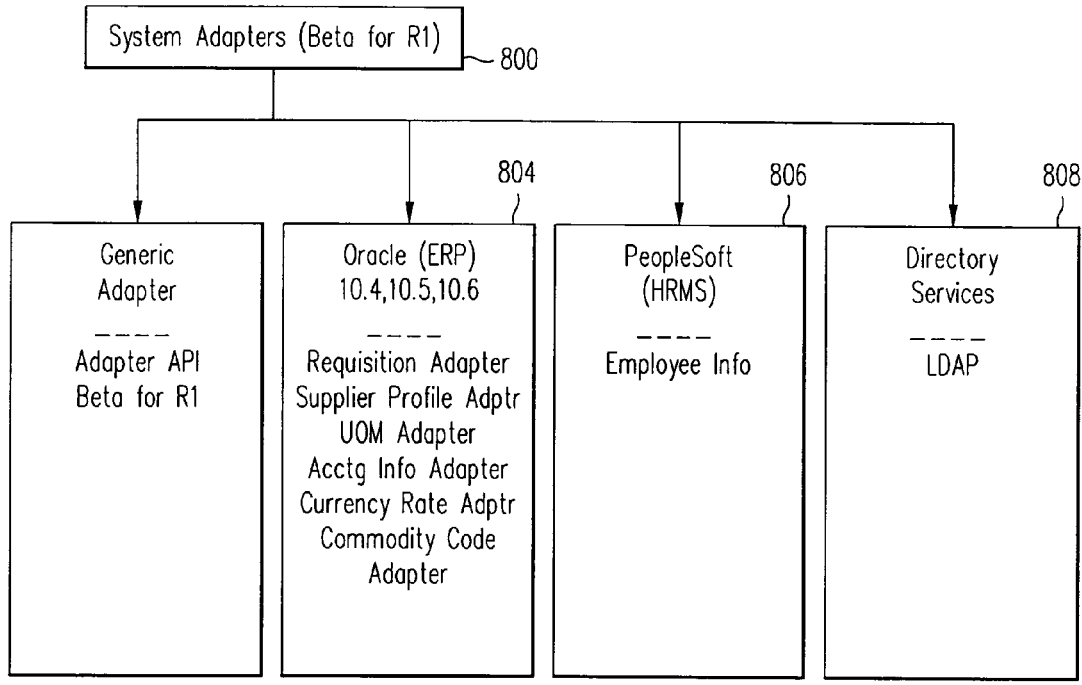
FIG. 8 shows the system adapters of an embodiment of the invention.
Figure 9:
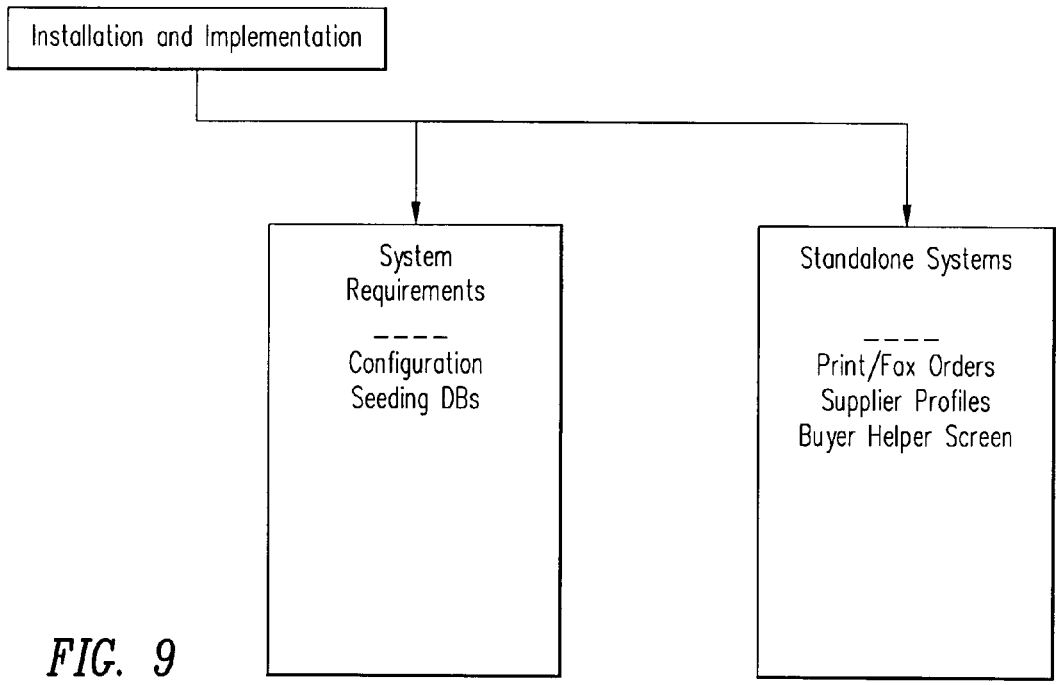
FIG. 9 shows the installation and implementation comprehended in an embodiment of the invention.

After a request is submitted, another piece of user interface software 500 comes into play: the Organizer 504 (FIG. 5). In a preferred embodiment, the Organizer 504 software provides a folders-style view of existing requisitions, designed to help group and organize large collections of requisitions.

When a request is submitted, approval software (approval engine 110 in FIG. 1; step 322 in FIG. 3; approval flow software 602 of the system environment 404, in FIG. 6) inspects the approval rules of the company, decides who needs to approve the request, and notifies the first required approvers, preferably by e-mail, that there is a requisition waiting for their attention. In one embodiment, the e-mail notification message includes a URL hyperlink that points the approver directly to the Organizer software 504 via his browser, to display the requisitions waiting for this person's approval. The approver can approve or deny, and make comments, asking for more information or clarification.

Whenever there is a status change in a requisition, notification software 120 sends an e-mail message notifying the requester and any other interested parties. The system uses notification e-mails throughout the approval process to keep users informed about the current state of a requisition. Requesters can also use the Organizer software 504 to check the status of a request at any time, to keep apprised who has or has not approved it, when it has been fully approved, and so on.

Using the Organizer 504 and the commenting mechanism, everyone in the approval process (e.g., approvers, requisitioners, and Purchasing Agents) can ask each other questions, view the status of a requisition, or make comments about the requisition, reducing confusion and improving communication.

After a requisition is fully approved, supplier interface software 330 communicates with the suppliers to give them the order. The system may communicate with supplier systems via conventional means, such as fax and e-mail. When a requisition is completed, the system will check the requisition to determine which suppliers are involved, determine the preferred method of ordering for those suppliers, and use that method for transmitting the requisition to the supplier. The pieces of the system used to transfer orders for fulfillment are known as the ordering modules 130 (FIG. 1) (see also, FIG. 7).

There are three ordering modules 702 (see FIG. 7): a Purchasing Card module, a Direct Order module, and a Purchase Order module.

Eventually the requisition will be approved, submitted, and fulfilled. As discussed above, the system may communicate orders to the supplier via conventional means (fax and e-mail). But once the item is shipped, and arrives on the requisitioner's doorstep, receipt of the item must be acknowledged before payment is made.

The system includes a user interface for acknowledging receipt, which allows employees to acknowledge that various items have been received. These desktop receipts are all stored in the system and not integrated with the ERP.

In addition to the requisitioning population—the requesters and approvers—there is another class of users: members of the Purchasing Department. The Purchasing Agents are responsible for the buying practices of the company, ensuring that the company is doing business with the most appropriate suppliers and ensuring that employees are buying the most appropriate items.

It is desirable to get the Purchasing Department out of the loop of the requisitioning process. However, it is also desirable for them to retain control over the process. The system balances those desires by involving the Purchasing Department only when there something unusual about a particular requisition. For example, a Purchasing Agent will typically be involved when someone tries to buy an item from an unapproved supplier or when someone specifies an unusual ship-to address.

The Purchasing Department, via Administrative Tools software 506 (FIG. 5), defines which products and suppliers are "approved". The Purchasing Department also implicitly and explicitly manages the Product Information Database, which describes the collection of approved products and services. The Administrative Tools software 506 provides Purchasing Agents with the ability to add or remove items from the Product Information Database, or remove items when a relationship with a supplier changes or an item is otherwise obsolete.

Another piece of the user environment 500 of the system is Reports and Graphs software 508 (FIG. 5), which allows a company to summarize, group, and understand its purchasing history. The system preferably provides software to generate one collection of predefined reports that can be run at any time, giving purchasing agents and system administrators information they can use to refine their buying process and maximize the gain from automation. This information can be a valuable tool for gaining understanding and using that understanding to make improvements, such as modifying the approval processes or switching suppliers or updating the history of purchases to encourage different buying patterns by end-users in the future.

The system environment 404 is the "back-end", the parts of the system that do not directly interact with the users.

Flexibility and configurability are important to the design, because each company wants to maintain slightly different data and enforce slightly different business rules. To support the goal of flexibility, one embodiment of the system is designed to allow companies to customize the set of data fields, recognizing that every company has a slightly different set of information that must be kept.

These "extensible fields" are defined by the customer, on a system-wide configuration file, and are available both via user interface software and throughout the business rules. There are examples throughout this patent application of how such fields can be used. For example, a company might wish to extend the set of data fields to describe its own accounting policies and categories.

Approval rules are the conditions that a company uses to decide which approvers are required for a particular requisition. The system preferably provides a mechanism for describing the approval rules that is flexible enough to model the existing process at any company. Every company will have its own set of rules, although there are often basic similarities, and many rules can be copied from simple examples. For example, an approval rule may be expressed as a set of conditional expressions, such as "If the amount of this purchase is over $25,000 and it is for software, then the Information Systems department must approve the purchase."

There are at least two things to note about the approval rules. First, approval rules can be based on any field in a requisition, including the fields that are added during the implementation process. So, in addition to standard approvals based on requisition or line item amounts, for example, the Facilities Manager might need to approve any furniture purchase, or the IS department might have to approve any computer system purchase.

In addition, an approver designation does not have to be given to a particular individual in the company. Rather, a particular role can be designated in an approval rule as an approver. An example role is the "CFO" role. At any given time, this role is played by a single individual in the company, but if there is a new CFO hired, then all the requisitions that are awaiting approval by the CFO can be approved by the new CFO when he comes on board, without any system maintenance. When the individual who is the new CFO is designated in the system as CFO, he will be notified of all requisitions pending approval for the CFO role.

Roles can also describe a group of people. For example, there is the role of Purchasing Agent. There might be any number of Purchasing Agents in the company, but if the role Purchasing Agent is assigned to a requisition, then all individuals designated by the Purchasing Agent role see it for their approval. In one embodiment, if any one of them approves it, the requisition is approved for that role.

Adapters 122 (FIG. 1) and 800 (FIG. 8) are software modules that link the system to the rest of the enterprise. The system obtains and stores all data through an adapter layer that integrates the system with existing services, using data that already exists in those legacy systems. This assists in avoiding duplication of information within the enterprise. If an adapter for particular data does not exist, then the system will store the information internally, but if the data exists elsewhere in the enterprise, then the system will use the data through an adapter.

Significant adapters are adapters 804 to the ERP system in the company. These adapters may be customized to interface with each ERP (e.g. Oracle 10.4, 10.5, 10.6, SAP, Baan, D&B, PeopleSoft, etc.). The ERP adapters can obtain simple information from the ERP like units of measure, accounting information, etc., as well as item templates, supplier information, approval matrices, and other relatively static information. They are also capable of storing the entire approved requisitions back into the ERP.

Another source of information in a company is the description of all of its employees, including names, organization information, contact information, and so on. Often this information comes from an HRMS system. In one embodiment, an HRMS adapter 806 (e.g., to Peoplesoft, Version 5.0) is provided.

There are also adapters 808 for user authentication systems. User authentication information is commonly stored in external directory services like LDAP, Microsoft Exchange, or Unix NTS.

Now that an embodiment of the system has been broadly described in overview, portions of the embodiment are now described in greater detail.

User Environment

This section describes the pieces of the system that employees see: the user interfaces and associated help and wizard systems.

When reading this section, the extensible fields design should be kept in mind. That is, each instantiation of the system can have a slightly different user interface, customized to present the information appropriate for that particular company. This document contains a number of tables describing data fields. Each table differentiates two kinds of fields:

An intrinsic field is a field that the system expects to find.

An extrinsic field is an additional custom field, typically added during installation. There can be any number of extrinsic fields, depending on what a particular company desires. The system will store and display the information in these fields, but in a preferred embodiment, will not depend on having the information there. This document contains a number of examples of extrinsic fields, to illustrate how they can be used.

Requisitions

This section describes the basic functionality of the system: how employees go about asking for something by creating a requisition.

1. Starting New Requisitions

The user interface for creating requisitions should be appropriate for both novice users—people who may use the system only once or twice a year—and expert users, who may use the system almost daily.

The system allows users to create new requisitions in at least the following ways:

a. With the requisition Wizard, which guides the employee through a series of questions at each step, providing navigational aids to keep track of the big picture, and presenting lists of choices whenever possible instead of asking the employee to type things in.

b. By cloning existing requisitions.

2. Filling in Requisitions

A requisition can contain any number of individual line items that the employee would like to order. In one embodiment, there are some parts of a requisition that are shared among all line items, and others that are specific to individual line items. To initialize the information that applies to the entire requisition, the system will:

a. Fill in fields of the requisition from the employee's personal profile, as available. For example, the shipping information and default department will be initialized from the personal profile. The employee will be able to change any of these defaults for a particular requisition.

b. Generate unique alpha-numeric identifiers for each requisition. The format of the numbers can include a prefix string, defined as part of the company configuration.

C. Allow the employee to give titles to requisitions, more mnemonic than the requisition identifier.

d. Provide a way for one employee to prepare a requisition and submit it for someone else. That is, allow the creator and submitter to be different people. If the requester and the submitter are different, then the standard approval rules will put the requester as the first approver.

e. Allow the employee to specify a hold date on a requisition. The hold date is the date that the employee would like the requisition to be actually submitted to Purchasing. If the requisition is fully approved before the hold date, then the system will hold the requisition until the hold date. If there is no hold date, then the system will submit the requisition as soon as it is fully approved. In one embodiment, holding is a company-wide feature, and can be turned off in the system profile for an entire company, if that company does not choose to allow the hold functionality.

f. Allow the employee to specify the reporting currency of a requisition and display the total for the requisition in that currency. The reporting currency of a requisition defaults from the employee's default reporting currency. The system will display each currency with the appropriate precision.

g. Timestamp each requisition with the time the employee initiated the requisition.

Table 1, below, summarizes the fields of a requisition record.

TABLE 1

Fields of Requisition

| Field Name | Description | Intrinsic? |
|---|---|---|
| 1. Number | Unique ID for this requisition is assigned. Uses the prefix string defined in the system profile. | Intrinsic |
| 2. State | {Unsubmitted, Submitted, Fully Approved} | Intrinsic |
| 3. Requester | Name of person who submitted the requisition | Intrinsic |
| 4. Preparer | Name of person who prepared the requisition. | Intrinsic |
| 5. Title | Name chosen by the employee | Intrinsic |
| 6. Creation Date | Date and time on which the requisition was generated; the New requisition time. | Intrinsic |
| 7. Submitted date | Date and time on which the requisition was submitted; the Submit time. | Intrinsic |
| 8. Approved Date | Date and time on which the requisition was fully approved. | Intrinsic |
| 9. Hold-till Date | Date on which the employee would like the requisition released to purchasing. | Intrinsic |
| 10. Ship-to | Default ship-to address. Can be overridden for individual line items. | Intrinsic |
| 11. Reporting currency | Default currency for displaying totals and for ad-hoc items that the user creates. | Intrinsic |
| 12. Line items | Individual items being ordered. See the table below. | Intrinsic |
| 13. Department | Used as the default for newly-created line items, which can be overridden for individual line items. Initialized to the requester's department, but the requester may wish to override that initialization and provide a different default. | Extrinsic |
| 14. Deliver-to | Used for internal distribution, in companies with no desktop receipt capability. | Extrinsic |
| 15. Total Cost | Total cost calculated from Price Extended | Derived |
| **** | Extensible fields, custom to this company. | |

3. Adding Line Items

After creating a requisition, the employee can add any number of products and services to it, as line items of the requisition. The system guides employees toward choosing items from approved sources, rather than asking them to type in information manually: the interface emphasizes copying and selecting and deemphasizes typing.

The system provides the following ways for an employee to create a line item in a requisition:

a. By searching or browsing through a Product Information Database. The Product Information Database for a company is the collection of all items that have been approved for purchase.

The user may navigate the tree hierarchically, say by navigating through choices like Office Supplies, Computer Peripherals, Industrial Equipment, etc. and then from Computer Peripherals through Network Adapter, Disk Drive, Monitor, etc.

The user is also able to search the Product Information Database with a "contains" search on the following fields: Item Description, Supplier Part Id, Mfg. Part Id, Mfg. Name, and Commodity Code.

b. By choosing from a list of personal favorites. In one embodiment, a Favorites list is a "flat" list of up to 25 items that the employee has chosen and marked as Favorites.

c. By manual entry, typing in or using the copy function to order an item that is not available either from the Product Information Database or from any Web catalog. When entering an item from scratch, the requester can suggest a supplier (by selecting supplier from a quickpick list or by directly typing it in), or leave it out, to be chosen by the Purchasing Agent. Requisitions for items that are not from approved sources typically trigger special approval rules, such as requiring a Purchasing Agent to approve the new item and supplier. The system provides facility for each company to define its own rules for handling such requests.

4. Filling in Line Items

After adding a line item, the employee is able to modify any of the information about that line item, as appropriate. Quickpicks are provided for all fields to maximize accuracy. In particular, the employee is able to:

a. Specify the quantity to be ordered b. Specify the ship-to and deliver-to addresses.

C. Modify the carrier or carrier method, if the defaults from the supplier are not appropriate. For example, the employee might want to ask for something to be shipped faster than the supplier's usual practice.

d. Specify a need-by date, to inform the supplier of the date by which the item needs to arrive in order to be useful.

The fields of a line item in a requisition record, in one embodiment, are described below in Table 2.

TABLE 2

Fields of a line item

| Field Name | Description | Intrinsic? |
|---|---|---|
| 1. Product Information | Information taken from the Product Information Database, which includes all information that the user cannot change; supplier, price, commodity code, unit of measure, etc. | Intrinsic |
| 2. Quantity | Quantity of the item to be purchased | Intrinsic |
| 3. Ship-to | Ship-to address for this line item. Defaults to that of the entire requisition. | Intrinsic |
| 4. Deliver-to | Deliver-to address for this line item. Defaults to that of the entire requisition. | Intrinsic |
| 5. Carrier | For shipping item. "FedEx" or "UPS", e.g. Defaults from item template for this item. | Intrinsic |
| 6. Carrier Method | E.G. "second day air" | Intrinsic |
| 7. Need-by date | Entered by employee, to describe the date that he or she needs the item to arrive. | Intrinsic |
| 8. Accounting Information | Accounting information, such as department, project, cost center, and account code. | Extrinsic |
| 9. Price Extended | Calculated from Quantity × Price. | Derived |
| **** | Extensible fields, custom to this company. | |

5. Comments and Attachments

Any employee who handles a requisition, be it requester or approver, can add commentary or attach documents to the requisition, helping everyone who sees it to better understand the requisition. The ability to comment and explain can go a long way toward making requisitions understandable to approvers, allowing them to provide feedback to requesters, and help them make a decision about whether to approve the request.

The commenting mechanism:

a. Allows users to add textual comments to any requisition or line item, using "threading" to maintain context.

b. Allows users to specify the audience for a comment, which can be any of Approvers, Requesters, Suppliers, Purchasing, or All. Comments are visible only to the specified audience.

c. Allows users to attach electronic documents to comments. To ensure platform independence, this feature is preferably implemented using a browser's mailing facility. If employees can send attachments from their mailer, then they can attach documents to a requisition.

6. Submitting Completed Requisitions

When an employee has finished filling out a requisition and asked to submit it, the system will perform the following checks before actually submitting the requisition for approval:

a. Find all mandatory fields (as distinguished from optional ones), and ensure that they have values. If there are any missing values, then the requisition is returned to the user for more editing.

b. For each field that has a value, verify the data in that field to ensure that values are valid for the field involved as well as validating that the account combinations (e.g. Account, department, etc.) are valid. If there are validation procedures for any of the extrinsic fields (custom to this company), then run those validation procedures as well. If there are any invalid fields, then return the requisition to the user for more editing.

C. Check each line item and assign a suggested buyer for that line item. The company can parameterize the rules for assigning buyers to line items, based on any fields in the requisition. If there is a direct order agreement with this supplier, the suggested buyer will be the buyer agreed on in the supplier profile. (The supplier profile specifies whether there is a direct order agreement in effect.)

d. Add bill-to information, using default from system profile.

e. Timestamp the requisition with the current date and time, as the submission date of the requisition.

f. Determine the approval path for this requisition, using the approval rules defined in the business rules for the company, and allow the employee to preview the approval path. Allow the employee to either confirm the submission, or cancel it and return to editing the requisition.

The Organizer

The user interface software for categorizing and classifying requisitions is known as the Organizer 504 (FIG. 5). Approvers use the Organizer software to approve or deny requisitions and requesters use it to check status and history.

When a request is submitted, the system checks the approval rules of the company, decides which users need to approve the request, and in what order, and then notifies the first approver that there is a requisition waiting for attention. Each approver sees new requisitions in a folder of incoming requisitions, and will need to take action on the requisition to move it to a different folder.

1. Approving or Denying Requisitions

When an approver goes to the Organizer interface, be it from a notification message, a bookmark, or some other hyperlink, the Organizer displays the incoming requisitions for that approver, showing the information in Table 3, below, for each requisition:

TABLE 3

Fields of an approval request

| Field | Explanation |
|---|---|
| 1. Role | Role required for this approval, such as "CFO". |
| 2. Reason | The reason this approver needs to approve; this is the justification field |
| 3. Actual Approver | The name of the person who is filling the approval role. This is typically the approver's name, if the approver is looking at incoming requisitions. |
| 4. Required/Optional | Boolean indicating whether this approval is required, or whether this approver is a "watcher". |
| 5. Submission Date | The submission timestamp. |

Whenever an approver acts on a requisition, the system timestamps the requisition with the name of the approver and the time of the action.

If an approval is marked as required, the approver can take any of the following actions on the requisition:

a. Approve the requisition. An approval will trigger any notifications specified in the business rules for this company, mark the request as approved for this approver, and add the request to the incoming folder for the next approver in the approval chain. After approving a request, the approver can move it into some other folder, or leave it in the incoming folder.

b. Deny the requisition. When an approver denies a requisition, the system sends an e-mail notification to the requester, and stops any further approval requests in this serial approval chain. If the requester does nothing in response to a notification of denial, the request will eventually time out. If the requester modifies the request and resubmits it, the system starts the approval process again, as described in step 5) below.

C. Add an additional approver to the approval chain, either before or after this approval. For example, an approver might want to say "Please ask Ed if he approves, and then come back to me".

d. Add comments.

e. Modify the requisition. Not all approvers can change all fields, however: a Purchasing Agent can modify any field of a requisition; other approvers can modify only a limited set of fields in the requisition. The definition of which fields approvers can modify is part of the company's configuration of the data fields and is typically set up during installation.

When an approver modifies any field of a requisition, the system recalculates the required approvals and invalidates any existing approvals for that line item (if it was a line item that changed) or for the entire requisition (if the requisition itself was changed). Modifying a field can thus trigger reapprovals from users who have already approved the requisition, or trigger the addition of new approvers into the chain, depending on the approval rules.

If the approver is marked as Optional, then this approver is a watcher, not a true approver. Watchers are bystanders: they see the requisition but their approval is not required. Watchers can take any of the following actions on the requisition:

Add an additional approver to the approval chain, either before or after this approval.

Add comments.

2. Approving in the place of others

The system maintains the notion of chain of command derived from the "immediate supervisor" information in each employee's personal profile. Using that information, the system allows certain authorized approvers to approve in the place of another approver:

a. The system allows approvers to get a list of the requisitions that are waiting for approval from a lower-level approver (as defined by the business rules) and approve them directly. A high-level approver can explicitly approve in the place of any lower-level approver if the two approvers are in the same chain of command.

3. Removing Requisitions or Approvals a. A requester can withdraw his or her own requisitions at any point during the approval process, until the requisition is fully approved. A withdrawn request returns to the Unsubmitted state and any approvals that have been recorded so far will be removed.

b. An employee who has the role of Purchasing Agent can remove approvals from any requisition.

4. Organizing Requisitions

The Organizer helps employees organize groups of requisitions. It allows employees to:

a. Sort the requisitions by any of the fields that are displayed in the outline view. That is, if there is a column header for a field, then the employee can sort on that field.

b. Filter the requisitions by any of the fields that are displayed in the outline view. That is, if there is a column header for a field, then the employee can use the value of that field to restrict the information being displayed.

C. View the details of any requisition, including all line items, approvals, and comments.

d. Put the results of a search into a folder. For example, a purchasing agent might wish to examine all outstanding requisitions for items from a particular supplier.

e. Print any requisition on letter paper.

f. Fax any requisition, on platforms with integrated fax support.

Now, administration of the system is described, in the sense of making changes that are not part of the server configuration itself.

1. Maintaining Personal Profiles

An employee's personal profile is described in a configuration file that sets values for a user of the system. There are two kinds of information in a personal profile: Human Resources data fields and specific data fields. The Human Resources data fields are preferably initialized from the HRMS adapter, if there is one at the site, and are also updated regularly from the HRMS adapter. The specific data fields are created and maintained entirely within the system.

The system:

a. Allows employees to view and edit the specified fields of their own personal profiles, in a form consistent with the rest of the UI.

b. Submits all changes to personal profiles for approvals, as described in the approval rules of the company.

C. Allows employees to view the Human Resources data fields that are passed through from the HRMS adapter.

d. Allows employees to add or remove items from their favorites list.

Table 4, below, lists the specific data fields of a personal profile.

TABLE 4

Fields of Personal Profile

| Field Name | Explanation | Intrinsic? |
|---|---|---|
| 1. Organizational Level, Numeric | Numeric degree of separation from CEO. | Intrinsic |
| 2. Delegation of authority (DOA) | Any employee can designate approval authority to another user, for some period of time. | Intrinsic |
| 3. Start date of DOA | Start date for DOA. | Intrinsic |
| 4. Termination date of DOA | Expiration date for DOA. | Intrinsic |
| 5. Reason for DOA | A comment; a textual description of why the DOA is in effect. For example, "vacation". | Intrinsic |
| 6. Notification Frequency | As they occur, on interval, etc. | Intrinsic |
| **** | Extensible fields, custom to this company. | ** Extrinsic |

2. Maintaining the System Profile

The system profile contains configuration values for an instance of the system. The system profile (an example of which is shown in Table 5) is created when the system is installed. It is intended primarily for setting default values that will be used when creating profiles for new employees.

The system:

a. Allows the administrator to change the fields of the system profile, using a simple text editor or spreadsheet.

TABLE 5

Fields of a System Profile

| 1. System Name | Name of the company. | Intrinsic |
|---|---|---|
| 2. URL | URL of home page for this system | Intrinsic |
| 3. Approval escalation time | Default interval before approval is escalated. | Intrinsic |
| 4. Time-out interval | Time span before a requisition times out, if it has been in the system with no action. | Intrinsic |
| 5. Base currency | System's standard currency | Intrinsic |
| 6. Fiscal Year | Date on which the fiscal year for this company begins; used to calculate dates for reporting purposes. | Intrinsic |
| 7. Notification frequency | Default that can be overridden by employees. | Intrinsic |
| 8. No notification okay? | Boolean indicating whether employees can turn off notifications. | Intrinsic |
| 9. Hold dates okay? | Boolean indicating whether employees can specify hold dates on requisitions. | Intrinsic |
| 10. Default ship-to address | Default that can be overridden by employees. | Intrinsic |
| 11. Default bill-to address | Default for this company | Intrinsic |
| 12. Requisition number prefix string. | Prefix used when numbering requisitions. | Intrinsic |
| 13. Direct Order number prefix string | Prefix used when numbering direct orders | Intrinsic |
| 14. **** | Extensible fields | **** |

3. Maintaining the Product Information Database

The Product Information Database of a company is the collection of item templates for items that are approved for purchase inside the company. Item templates are maintained entirely on the system. An example item template is illustrated in Table 6. The Purchasing Department of a company is typically responsible for maintaining the Product Information Database, helping to make it an accurate and valuable resource.

The system allows purchasing agents to create, edit, and remove item templates. This functionality is available only to purchasing agents. It allows them to:

a. Create new item templates. The need to create new item templates arises most often when there is a requisition for an item that is not in the Product Information Database. If the Purchasing Agent decides to approve the item, he or she will create a new item template for it and decide whether to add it to the Product Information Database.

b. Edit existing item templates. A purchasing agent can modify an existing item template, (e.g., update supplier information or price).

c. Remove existing item templates. A purchasing agent can deactivate an item from the Product Information Database, if the purchasing agent decides that the item is invalid or no longer recommended. This can happen for any number of reasons, such as when the relationship with a supplier changes or when a particular item is no longer available from the supplier. When a purchasing agent makes such a change, he or she can use the Organizer view to check all outstanding requisitions to see if there are any that are impacted by the change.

d. Read in text files from suppliers, with SIC code, map those SIC codes into internal commodity codes, and then add the relevant items into the Product Information Database.

e. Build and maintain a hierarchical view of the Product Information Database, so users can find things navigating about through categories.

TABLE 6

Item Template

| 1. Item Number | Number that uniquely identifies the item. Defined by the system. | Intrinsic |
|---|---|---|
| 2. Item Type | Key that assigns the item to a group of items (e.g., office supplies). | Intrinsic |
| 3. Commodity Code | Commodity code of the item. Commodity codes are per-company. | Intrinsic |
| 1. Item Number | Number that uniquely identifies the item. Defined by the system. | Intrinsic |
| 4. Desktop Receipt? | Whether the item is eligible for desktop receipt. | Intrinsic |
| 5. Delivery lead time, in Days | Number of days needed to procure the item when it is purchased externally. Need a value for "unknown." | Intrinsic |
| 6. Supplier ID | Unique ID for the supplier of this item | Intrinsic |
| 7. Company Unit Price | Purchase price, per unit, in this company | Intrinsic |
| 8. Supplier URL | URL for additional information. | Intrinsic |
| 9. Manufacturer URL | URL for additional information | Intrinsic |
| 10. Carrier | Preferred carrier for this item | Intrinsic |
| 11. Carrier method | Preferred method for this item | Intrinsic |
| 12. Transfer Method | {ERP, Direct Order, None} Dominates over supplier designated transfer method | Intrinsic |
| 13. Supplier | Link to the supplier. | Intrinsic |
| 14. UOM | Unit of measure for item | Extrinsic |

TABLE 6-continued

Item Template

| | | |
|---|---|---|
| 15. Item Description | Textual description of the item | Extrinsic |
| 16. SIC code | Standardized code for the item. | Extrinsic |
| 17. List unit price | Purchase price, per unit, set by supplier | Extrinsic |
| 18. Buyer | Role responsible for buying the part; input to the approval rules | Extrinsic |
| 19. Taxable | Boolean indicating whether item is taxable | Extrinsic |
| 20. Supplier Part Number | ID for this item, from the supplier | Extrinsic |
| 21. Manufacturer part number | Id from manufacturer | Extrinsic |
| 22. Manufacturer name | Name of manufacturer | Extrinsic |
| **** | Extensible fields | **** |

The system provides a reporting facility to help buying companies summarize, analyze, understand, and improve their buying process. The system comes with a number of pre-defined reports, ranging from buying patterns (e.g., are we buying too much of something or too little?), to reports on the process itself (e.g., who is not approving in a timely manner). This information can help the company refine its practices, say by modifying the approval processes or switching suppliers.

1. Defining Reports

The system provides a variety of reports to categorize and group the information contained in the system. The reporting mechanism allows employees to parameterize reports and run them. but not to define ad-hoc reports. Employees are able to:

a. Save the results of any generated report to a file. There are two output formats: one that can be read by spreadsheets, and one that is plain text, for human consumption.

b. Print any of the generated reports.

c. Define the reporting period for any report. The period of a report can be described as {All, This Day/Week/Month/Year/Quarter, Last Day/Week/Month/Year/Quarter, Other (where a specific beginning and ending date can be specified)}. The definition of Quarter is set from the system profile.

2. Standard Reports for All Employees

Table 7, below, shows standard reports that are available to all employees.

TABLE 7

Standard reports for all employees

| Report Name | Priority |
|---|---|
| 1. Requisitions for specified period | 1 (High) |
| 2. Summary of approved orders for a period | 1 (High) |
| 3. Requisitions still to be approved, by whom | 1 (High) |
| 4. Line items by supplier | 1 (High) |
| 5. Line items by approver | 1 (High) |
| 6. Average # of lines | 1 (High) |
| 7. Requisitions by commodity | 2 (Medium) |
| 8. Average time to approve | 2 (Medium) |
| 9. Requisitions denied, grouped by whom | 3 (Low) |

3. Standard Reports Available to Purchasing Agents

Provide the standard reports as shown in Table 8, available to any employee who has the role of purchasing agent:

TABLE 8

Standard Reports for Purchasing Agents

| Report | Explanation | Priority |
|---|---|---|
| 1. Open order follow-up report | | 1 (High) |
| 2. On-time delivery report by supplier | Need limited set of buckets, such as "on-time", "# of days early", "# of dates late", etc. | 1 (High) |
| 3. $ or items by supplier, in alpha order | Output to spreadsheet for graphics | 1 (High) |
| 4. # of transactions per employee, supplier, dept, div | Output to spreadsheet for graphics | 1 (High) |
| 5. Summary Report | Supplier, Item, dept, date ordered, date received, Requester, Expected delivery | 1 (High) |
| 6. Order list for a supplier to date | Only summarizes total of PO | 1 (High) |
| 7. Total orders to suppliers | | 2 (Medium) |
| 8. Suppliers, alphabetically | Brief list of suppliers, sorted alphabetically | 3 (Medium) |
| 9. Unreceived orders by Supplier | | 3 (Medium) |
| 10. Number of requisitions initiated by a given employee, in some period | Watching for people who consistently order just under an approval limit | 3 (Low) |
| 11. Paper vs. electronic | Number of electronic requests submitted, as compared to number of paper ones | 3 (Low) |
| 12. % of items ordered that were ad-hoc | Tracking ad-hoc items vs. catalog items | 3 (Low) |

System Environment

Approval Flow

Each company generally has its own approval process for defining who has to approve each requisition. The system models this process with a set of approval rules, which each company can parameterize and extend. The approval rules are defined as part of the installation process, but can be modified by the customer's system administrator at any time.

The approval rules are preferably stored in text files that can be edited with any text file editor.

1. Parameterizing Approval Rules

The simplest form of approval rules is a tabular file format, which describes values to be used in the rules. This file format allows the customer to:

a. Parameterize the approval rules by editing the values in the tabular file. For example, a company can change the dollar amounts to be associated with approval by various management levels, without changing the approval rule itself.

b. Change the parameters while the system is running. The system will read in new parameters without downtime.

2. Approval Rules

For describing the approval rules, the system provides a simple scripting language, generally flexible enough to describe any condition or set of conditions file approval. In one embodiment, each rule has:

a. A justification field, to be used as explanation for why the rule was invoked.

b. A predicate, which determines when the rule applies. The predicate can be based on any field in the requisition, such as commodity, currency, amount of purchase, ship-to address, or even the customized (i.e., extensible) fields that this particular company has added.

C. A consequent, for when the predicate applies. The consequent designates which role or roles need to approve the requisition. For example, a company might write a rule that requires employees with the role of purchasing agent to approve any requests that are for amounts over $200 and that have a ship-to address that is different from the default ship-to address. The particular amount, the $200, will be specified in the tabular file; the predicate-consequent will be in the rules file.

d. A way to describe which approvals can be done serially, and which can be done in parallel. For example, an organization may want the management chain approvals to go serially, but other approvals (like Facilities and IS) to go in parallel.

3. Buyer Assignment Rules

Each line item in a requisition has an assigned Purchasing Agent. The system sets the assigned Purchasing Agent before submitting the request for approval. Each company can define its own rules for how buyers are assigned, using the same mechanism used for defining approval rules. For example, a company might wish to have the assignment of buyer be dependent both on the type of the commodity and the amount of the purchase.

4. Escalation and Timing Out

The system provides the ability to escalate an approval, either manually or automatically, for occasions when an approver has not responded to a request for approval. Escalating an approval request moves it up the management chain, to the approver's immediate supervisor.

The system provides the following features for escalation:

a. A requester can escalate a request manually.

b. If an approver has not responded to a request for approval within the escalation time period defined in the system profile, the system will escalate the approval request automatically. Escalation will continue up the chain as necessary, until someone takes action or there is an employee with no supervisor.

C. If a requisition has not been approved within some time period, as specified in the system profile, the requisition will time out. That is, any request that has been submitted but not yet fully approved within the specified time frame will be escalated to the administrator.

d. Once an approval request has been escalated, the original designated approver can no longer take action on that request.

5. Delegation of Authority

Delegation of authority (DOA) is a substitution of one approver for another in a specified time period, say when an approver is on vacation. In one embodiment, the system supports delegation of authority in the following ways:

a. Any employee can delegate his or her authority to another employee for some period of time. DOA includes a start date, end date, and comment field explaining why the DOA is in effect. The DOA is stored in the employee's personal profile: like all changes to personal profiles, delegations of authority are subject to the approval rules of the company. An employee cannot delegate to more than one person at a time, or split the DOA among more than one designee.

b. If there is a delegation of authority for an employee, and the date for the delegation has not expired, then the system will allow the delegate to approve in the place of the employee.

C. Log all delegations of authority as part of the audit trail.

Shared Services

1. Authentication and User Rights

All employees must log in and be authenticated in order to use the system. There are three kinds of users in the system: Purchasing Agents, Administrators, and Employees. Purchasing Agents and Administrators are allowed to do some operations that Employees are not allowed to do. Table 9, below, lists the operations that are restricted to certain kinds of users:

TABLE 9

User Rights Requiring Authentication

| Role | Functionality |
|---|---|
| 1. System Administrator | Designate other employees as administrators or purchasing agents |
| | Load new business rules into the server |
| 2. Purchasing Agent | Remove approvals from requisitions |
| | Edit any field of a requisition |
| | Modify the Product Information Database |
| | Modify the specific fields of the supplier database |

2. Events and Notification

The system provides a notification mechanism, designed to help keep all interested parties informed about what's going on with a particular requisition. The system defines a set of events, which are the triggers for notifying employees, and the recipients of the notifications. In one embodiment, there is no customization of the set of events.

The system will:

a. Provide e-mail notification for each of the defined events, which are summarized in Table 10, below. The notification message preferably includes a hypertext link to the Organizer.

b. Allow employees to customize the frequency of notification per event. The notification frequency can be specified as Never, Immediate, or On Interval, where the interval is an integer number of Seconds, Minutes, Hours, or Days. The decision of whether to allow employees to specify Never is preferably part of the system profile—that is, choosing whether it is possible to turn off notification altogether is a decision made on a per-company basis.

TABLE 10

Events Requiring Notification

| Event | Action |
|---|---|
| 1. Approval is now required | Notify activated approver. |
| 2. An approver takes action: approves or denies. | Notify requester. |
| 3. New approver or watcher added | Notify requester. |
| 4. Requisition has been modified | Notify requester. |
| 5. Final receipt submitted | Notify Purchasing. |
| 6. PO# Assigned to Requisition Line Item | Notify Requester. |
| 7. Time expired for delivery: if the Need-by date passes and no receipt acknowledgment has been sent. | Notify requester that a receipt is required. |
| 8. Requisition has been escalated to next-level approver. | Notify current approver and activated approver and requester. |
| 9. Requisition is soon to be escalated. | Notify approver. |
| 10. Requisition is soon to time out | Notify requester. |
| 11. Requisition has timed out | Notify requester. |

3. Database Support

The system uses a database to store all internal data, and record all transactions between clients and the Enterprise Server. In one embodiment, this database resides on an Oracle Database Server.

4. Customer Support and Feedback

There is an interest in feedback from customer sites to understand how customers are using the system and how they would like to use the system. To encourage such feedback, the system:

a. Provides a simple feedback command, to allow customers to e-mail suggestions.

b. Provides a support newsgroup or Website.

c. Sends serious system errors as they occur.

d. Sends line items count statistics on a monthly basis, via email at the end of each month.

5. E-Mail Integration

The system integrates with e-mail programs already in place (e.g., SMTP), so the system can send employees notifications via e-mail.

Business Modules

The Business modules are separable pieces of the system.

Ordering Modules

An ordering module is the piece of the system that takes a fully approved requisition and submits it for fulfillment. When a requisition has been fully approved, the system will:

Timestamp it with the date and time of the final approval

Check the requisition to determine which suppliers are involved, and choose a supplier site if there is more than one site for the specified supplier Choose the preferred ordering module for each of those suppliers and use it to transmit the order.

The three ordering modules are a Purchasing Card Module, Direct Order Module, and a Purchase Order module.

1. Purchasing Card Module

The Purchasing Card ordering module supports the use of purchasing cards as a payment mechanism. Purchasing cards (p-cards) can be associated with particular employees or suppliers, but are maintained by an administrator, who ensures that the cards are valid and are being used appropriately. Purchasing card transactions are reconciled on some regular basis with the bank that issued the purchasing card.

The system maintains the following data associated with each purchasing card, as shown below in Table 11.

TABLE 11

Data associated with a purchasing card

| Card field | Explanation | Intrinsic |
|---|---|---|
| Card number | ID of card. Assigned by administrator. | Intrinsic |
| Employee ID | The employee's ID | Intrinsic |
| Accounting Codes | From the personal profile | Intrinsic |
| Expiration date of card | The last day this card can be used in a transaction | Intrinsic |
| Authorization limits (Single Transaction) | Absolute limit for a single purchase with this card. | Intrinsic |
| Cardholder name | Can be different from user name; must appear exactly as it does on card. | Extrinsic |
| Bank Name | Name of issuing bank on the card | Extrinsic |
| Bank # | ID number of the issuing bank | Extrinsic |

The purchasing card module:

a. Allows administrators to assign cards to employees and modify the expiration date or authorization limits on purchasing cards.

b. For each fully approved requisition, verifies whether a p-card can be used for this purchase:

Ensure that the supplier accepts p-cards. If not, chooses a different ordering module.

Chooses a p-card number: If the supplier has a ghosted p-card number, then that is the preferred p-card number. Otherwise, if the employee has a p-card number: uses it. Otherwise, chooses another ordering module.

Checks the amount of the purchase. If it exceeds the per-transaction limit on the purchasing card, then chooses some other ordering module.

c. For each transaction using a purchasing card, the system records data as shown in Table 12. The data is reconciled with banks on a monthly basis, using a printed report of the transactions. The reports used for reconciliation show an "allowed variance," because the values (i.e., the p-card order total) do not include tax and shipping, but the bank values do.

TABLE 12

Data in a p-card transaction

| Field | |
|---|---|
| Transaction Date | |
| P-Card Order # | This is the ID (which has to be assigned) of the transaction, which is used to identify the transaction in communications between the supplier and the system. |
| P-Card Order Total $ | Calculated sum of line items in order. Printed as a range, within allowed variance. |
| Supplier CC Merchant Number | ID of supplier. Used for reconciliation. |

Reports

When a company purchases this module, there are additional standard reports available. Reports as described below in Tables 13 and 14 are provided.

TABLE 13

Reports for Employees

| Report Name | Priority |
|---|---|
| Statement of Account for the Employee for the Credit card period. Lists each transaction. | 1 (High) |

TABLE 14

Reports for Purchasing

| Report Name | Priority |
|---|---|
| Monthly P-Card Transaction Statistics. This report is intended to be used for manual reconciliation at the bank. | 1 (High) |
| Transaction Audit Listing (Grouped by cardholder) | 1 (High) |
| General Transaction Listing by organization and card holder (For Reconciliation) | 1 (High) |

1. Direct Orders (DO's)

The direct order module is an ordering module that supports communication of orders directly between the buyer and supplier, without storing the requisition in an ERP system. There are typically no constraints on orders under direct billing agreements. The direct order agreement includes terms and conditions, and specifies the frequency of billing.

If there is a direct order agreement with a supplier, then the system:

a. Checks that the transfer method has been designated for direct order in the item template. If neither the purchase order (PO) or DO order module has been designated in the item template then the supplier profile will be checked for the transfer method. If the supplier profile indicates direct order, then that is the method. Otherwise, it is treated as a PO.

b. Transmits the requisition directly to the supplier via fax or e-mail, as specified in the supplier profile. All requisitions transmitted to the supplier are recorded in the audit trail database. Receiving acknowledgement information is maintained only in the system.

c. Provides a report of transactions from the system to help the Purchasing Department reconcile with the master statement from the supplier. The frequency of the report will mirror the frequency of the report from the supplier.

2. Purchase Orders

The purchase order module is an ordering module whose case results in a purchase requisition in the ERP system. The system transmits the requisition to the ERP adapter, as an ERP requisition. Once the requisition is in the ERP, the Purchasing Agent can manipulate it with standard ERP operations to complete the process. For example, the agent typically autocreates a purchase order from the requisition, prints it out, an sends it to the supplier for fulfillment.

Receiving

After an order is approved and submitted and transferred to the supplier, eventually the supplier will ship the item and the requester will receive it. When an item is received, the requester must acknowledge receiving the item; receipts are the final acknowledgment to trigger payment.

The system includes a user interface for acknowledging receipt, which allows employees to record that various items have been received. The receipts will be stored in the system, and there will be no interaction with the underlying ERP, if there is an ERP present. A system level toggle that can be set during implementation activates the receiving module.

1. Acknowledging Receipt of an Item

The system provides a simple form (the fields of which are shown below in Table 15) for the employee to indicate that he or she has physically received an item. This receiving interface:

a. Allows an employee to acknowledge receipt of an ordered item and to record the number of items received, showing the information in the table below. The employee is able to acknowledge either a single line item or an entire requisition.

b. Allows an employee to reject either an entire requisition or an individual line item. When an employee chooses to reject something, the system will ask for a free-form comment, describing the nature of the rejection. There are no partial rejections on quantity, though the employee can convey that information in a comment.

TABLE 15

Fields for receipt acknowledgment

| Field | Explanation |
| --- | --- |
| 1. Date received | Defaults to current date and time; can be overridden by the employee |
| 2. Need-by-date | As originally set in the requisition |
| 3. Item description | Link to the line item |
| 4. Comment | Free form comment, for noting problems. Any sort of problem will cause the item to be routed to a purchasing agent, to be handled manually. |

Approvals and Notifications

If the employee rejects an item, the system notifies Purchasing, and records the rejection.

Reports

The reports shown in Tables 16 and 17 may be added to the core list of reports included with the core system.

TABLE 16

Reports for Employees

| Report Name | Priority |
| --- | --- |
| 1. Items not yet received, sorted by supplier and due date | 1 (High) |
| 2. Items Received for a period; sorted by supplier | 2 (Med) |

TABLE 17

Reports for Purchasing

| Report Name | Priority |
| --- | --- |
| 1. Items not yet received, sorted by supplier and due date | 1 (High) |
| 2. Items Received for a period; sorted by supplier | 2 (Med) |

System Adapters

The system preferably uses adapters when possible, thus avoiding duplicating any information that is already available. But the system is not dependent on the presence of any of these adapters, and can run stand-alone when a company does not have a particular service or there is no adapter available for it.

Directory Service Adapters

The system preferably uses username and password information from a directory service within the company, if there is such a service at the company and if the comp any has the appropriate adapter. If the company has no authentication service, the system itself stores the employee name and password information, allowing appropriately authorized system administrators to create new users.

1. LDAP Authentication Adapter

A directory service adapter to LDAP is provided. LDAP (Lightweight Directory Access Protocol) is a protocol that provides a standard method for Internet clients, applications and WWW servers to access directory information across the Internet.

The LDAP adapter:

a. Uses the LDAP protocol for accessing corporate-wide passwords and use those passwords for authenticating employees.

b. Provides real-time authentication of users, if the customer's LDAP server is fast enough to support it.

Human Resource Management System Adapters

HRMS systems are used for maintaining employee information such as names, mailstops, and organization structure. If there is no HRMS adapter available, the system supports basic employee management, storing employee data in its own database and allowing appropriately authorized system administrators to Add/Delete/Modify Employees.

1. PeopleSoft HRMS Adater

An HRMS adapter to the PeopleSoft system, Version 5 is provided.

The PeopleSoft Adapter:

a. Extracts employee information from the PeopleSoft database on a regular basis and update the system with any new employees that have been created. When new employee updates arrive, the system fills in fields from the HRMS when available. Other additional fields are initialized with the default values from their immediate supervisor, or from the system profile if the manager is not in the system or cannot be found.

b. Extracts the fields shown in Table 18 below.

TABLE 18

Human Resources Data

| Field Name | Explanation | Intrinsic? |
|---|---|---|
| 1. Employee Number | Alpha-Numeric ID | Intrinsic |
| 2. Employee name | Last, First, MI. | Intrinsic |
| 3. E-mail Address | String | Intrinsic |
| 4. Department | For accounting purposes | Intrinsic |
| 5. Expiration date of employee | Allow for temporary employees, who can "expire". | Intrinsic |
| 6. Immediate Supervisor | Name of employee's immediate supervisor. | Intrinsic |
| 7. Fax number | Phone # | Intrinsic |
| 8. Preferred ship-to address | Address. Physical address, plus maildrop and dropzone or other company-specific info. | Intrinsic |
| 9. Job title, textual | Like organization level, but textual (i.e. "Director") | Extrinsic |
| 10. Telephone number | Phone # | Extrinsic |
| 11. Manager's e-mail address | For displaying during approval routing | Extrinsic |
| 12. Manager's phone number | For displaying during approval routing | Extrinsic |

ERP Adapters

ERP adapters are the pieces that integrate the system with an enterprise ERP system. The adapters are customized for each ERP (e.g., Oracle 10.4, 10.5, 10.6, SAP, Baan, D&B, etc.).

One embodiment of the system provides adapters to Oracle ERP versions 10.4, 10.5, and 10.6.

1. Requisition Adapter

The requisition adapter is the basic piece that integrates with the ERP. It pushes fully-approved requisitions into the ERP, where they are converted into Purchase Orders on the ERP system. The adapter can pull back the purchase order numbers for those requisitions, and store the PO numbers as extrinsic data fields associated with each line item.

The adapter pushes the following data for each line item:

Description
Comments
Requester name, if the requester exists in the ERP. If there is no such user name in the ERP, then there will be a standard catch-all user, -continued Approvals
Quantity
Unit Price
Unit of measure
Ship-to and Deliver-to addresses
Part number
Part description
Accounting information
Shipping details--Carrier and carrier method
Supplier 2. Units of Measure Adapter The system pulls the set of Units of Measure from the ERP, and use them in the user interface. The system pulls the following data:

Name
Abbreviation
Base unit of measure
Conversion to base unit of measure

3. Accounting Information Adapter

The system pulls accounting information from the ERP, with whatever accounting details are defined for the company. For example, the accounting fields might be:

Company name
Company business unit
Department
Account
Project information

4. Commodity Code Adapter

The system pulls commodity code information from the ERP. The exact structure of the commodity codes depends on the company. For example:

Commodity name
Accounting information per commodity

5. Currency Rate Table Adapter

The system pulls currency rate tables from the ERP, using the rate tables whenever currency conversion is required. The adapter pulls a table of currencies and conversion rates for each, pulling the following information:

Currency name
Currency rate
Date the specified rate is valid
List of valid currencies 6. Supplier Profile Adapter The system pulls supplier information from the ERP, on a periodic basis, and store that supplier information in supplier profiles. This adapter:

a. Pulls newly-created suppliers from the ERP. Purchasing Agents need to create new supplier profiles when someone requests a new item. That is, when a requisition includes an ad-hoc line item, the Purchasing Agent locates an appropriate supplier and adds a profile for that supplier in the ERP. The changes are then pulled back into the system.

The supplier profile in the system has the fields shown below in Table 19.

TABLE 19

Supplier Profile Data

| Field Name | Explanation | Intrinsic? |
|---|---|---|
| 1. Supplier ID # | Alpha-Numeric ID | Intrinsic |
| 2. Supplier Name | Textual name of the supplier | Intrinsic |
| 3. E-mail | Supplier's e-mail address | Intrinsic |

TABLE 19-continued

Supplier Profile Data

| Field Name | Explanation | Intrinsic? |
|---|---|---|
| 4. Site codes | Each supplier can have multiple sites; each site code has an associated address. | Intrinsic |
| 5. Dispatch method | Preferred method of transmitting information to the supplier. Either FAX and e-mail. | Intrinsic |
| 6. Fax number | Supplier's fax number | Intrinsic |
| 7. Transaction currency | Supplier's currency, in which transactions take place | Intrinsic |
| 8. Supports p-card? | Boolean indicate whether this supplier accepts p-cards | Intrinsic |
| 9. Ghosted p-card number | P-card to use when dealing with this supplier. If this field is present, the value always overrides the employee's p-card number. | Intrinsic |
| 10. Transfer Method | {ERP, Direct Order, None} | Intrinsic |
| 11. Telephone | Supplier's telephone number | Extrinsic |
| 12. URL | Supplier's Uniform Resource Locator | Extrinsic |
| 13. Our Customer # | Customer Number by which the supplier identifies us | Extrinsic |
| 14. Buyer | Assigned buyer, for use only when there is a direct order agreement with this supplier | Intrinsic |
| 15. Carrier | Supplier's preferred carrier: UPS, FedEx, etc. | Intrinsic |
| 16. Carrier method | 2-day air, etc. | Intrinsic |
| 17. Tax code | Tied to location | Extrinsic |

Features of One Embodiment: System Requirements

1. Scalability a. Provides a system that supports at least 10,000 requisitions a month.

b. Provides a system that supports at least 20,000 suppliers.

C. Provides a system that supports at least 35,000 employees.

d. Provides architectural support for multiple instances of the system at a single site. Each instance of the server supports only a single ERP instance. There are no "roll-up" capabilities between multiple instances of the server.

2. Supported Client Platforms

A Java client that runs within a Web browser, with Java support. Tested on the following platforms and systems:

Microsoft® Internet Explorer® 3.01 and later, on Windows NT 4.0.

Microsoft® Internet Explorers 3.01 and later, running on Windows 95.

Microsoft® Internet Explorer® 3.01 and later, running on the Apple Macintosh®.

Netscape® Navigators® 3.01 and later, running on Windows NT® 4.0.

Netscape® Navigator® 3.01 and later, running on Windows 95®.

Netscape® Navigator® 3.01 and later, running on the Apple Macintosh®.

Netscape® Navigator® 3.01 and later, running on Sun Solaris.

Netscape® Navigator® 3.01 and later, running on HP-UX (HP Unix).

3. Supported Server Platforms a. Provides an implementation of the server that runs on a dedicated Intel® Pentium Pro system running Microsoft® Windows NT® 4.0. Supports the following minimum server configuration:

Processor—Intel® Pentium Pro or equivalent 200 MHz or greater

Cache Memory—256 KB cache or greater

Memory—128 MB RAM or greater

Storage—4 GB hard drive or greater, depending on the size of the database.

b. Provides an implementation of the server that runs on a Sun Machine running Solaris 2.5.1, Oracle RDBMS 7.3.2.3 and the Netscape Enterprise Server 2.0.1.

4. Configuration a. Provides a template for gathering basic information about the site before the installation: host DBMS, operating system, ERP and HRMS interface issues, e-mail interfaces, accounting and purchasing procedures, supplier data, client hardware and software, supported browsers, network configuration, and business rules.

b. Configure the extensible fields and approval rules, using a text file editor.

5. Seeding the Database

For compatibility during the transition period, the system provides the ability to seed the database with requisitions that were approved manually, outside the system. This functionality is intended as a convenience to help a company transition from paper requisitions to electronic.

The system allows an administrator to enter a completed paper requisition into the system, without routing for signature. Requisitions entered in this way will appear in reports, but will not generate any approval requests or notifications, and will not be part of the Product Information Database without the explicit intervention of a Purchasing Agent.

6. Standalone Systems

This section describes features of the system that are available only to provide basic functionality when the system is stand-alone: when there is no ERP adapter present.

a. Provides the ability to print out purchase orders and transmit them to the supplier. The printed purchase orders include standard notes (such as the supplier's terms and conditions) and a purchase order number. This is the only time the system generates a purchase order.

b. Allows Purchasing Agents to modify the generated PO before it is sent to the supplier.

c. Provides a user interface for adding suppliers, providing a simple version of the supplier adapter functionality.

It should be understood that various alternatives to the embodiments of the invention described herein may be employed in practicing the invention. It is intended that the following claims define the scope of the invention and that the methods and apparatus within the scope of these claims, the their equivalents, be covered thereby.

What is claimed is:

1. A software system for efficient procurement of operating resources within resources within an enterprise, comprising:

requisition record generating means for generating a requisition record for a requisition, the requisition record indicating at least an operating resource that a requester desires to purchase, the requisition record generating means generating the requisition record responsive to a combination of:

input by a requester including a commentary entry describing a purpose for indicating the operating resource to the requisition record; and operating resource information in an operating resource information database;

electronic receipt generating means for generating an electronic receipt to acknowledge receipt of the operating resource wherein the electronic receipt indicates one of an acceptance or rejection of a received operating resource and facilitates payment for the accepted operating resource upon acceptance;

approval path determining means, responsive to the requisition record to approval rules in an approval rules database, for determining an approval path for the requisition record, among various ones of a plurality of possible approvers, required to approve the requisition record based on the commentary entry;

approval path handling means for guiding the requisition record along the determined approval path, wherein the approval path handling means generates a global approval indication based on the commentary entry and in response to the requisition record successfully traversing the approval path; and order generating means for deciding between at least one of a purchase card module, a direct order module, and a purchase order module to submit the requisition for fulfillment by a supplier.

2. The system of claim 1, wherein the order generating further comprises means for generating an order record to a supplier of the desired operating resource and for communicating the order to the supplier.

3. The system of claim 2, wherein the requisition record includes an indication of the supplier.

4. The system of claim 2, wherein the order generating means includes means for determining a method of communicating the order to the supplier.

5. The system of claim 1, wherein the approval path determining means determines the approval path for the requisition record at least in part in response to a purchase amount field in the requisition record.

6. The system of claim 1, wherein the requisition record generating means includes means for retrieving information about the requester from a personal profile database associated with the requestor.

7. The system of claim 6, wherein the information retrieved from the personal profile includes address information representing a destination to which it is desired for the operating resource to be sent and a department in which the requestor works.

8. The system of claim 6, and further including means for the requestor to override the information about the requestor retrieved from the personal profile database associated with the requestor.

9. The system of claim 1, wherein the requisition record generating means includes means for assigning a unique identifier to the requisition.

10. The system of claim 1, wherein the requisition record generating means includes means for receiving a unique identifier assigned to the requisition by the user via a user input means.

11. The system of claim 1, wherein the requisition record generating means includes:
means for receiving an indication of a hold time from the user via a user input means, wherein the approval path handling means begins to guide the requisition along the approval path upon occurrence of the hold time.

12. The system of claim 1, and further including:
means for submitting a requisition in response to the global approval indication, wherein the requisition record generating means includes:
means for receiving an indication of a hold time from the user via a user input means, wherein the requisition submitting means submits the requisition only upon occurrence of the hold time.

13. The system of claim 1, wherein the requisition record generating means includes:
means for receiving input from the requestor specifying a currency unit, and
means for reporting a purchase amount for the operating resource in units of the specified currency unit.

14. The software system of claim 1, and further comprising:
adaptor means for retrieving data from a legacy database program wherein the requisition record generating means completes fields of the requisition record using the data retrieved from the legacy database program.

15. The software system of claim 14, wherein the adaptor means includes a directory service adaptor for interfacing to a directory service of the enterprise.

16. The software system of claim 15, wherein the adaptor means is a human resource management system adaptor for interfacing to a human resource management system of the enterprise.

17. The software system of claim 16, wherein the adaptor means includes means for interacting to the legacy database program at specified time intervals.

18. The software system of claim 14, wherein the adaptor means includes means, responsive to the global approval indication, for transferring the requisition to an ERP system of the enterprise.

19. The software system of claim 18, wherein the adaptor means further includes means for retrieving, from the ERP system of the enterprise, a purchase order number corresponding to the requisition.

20. The software system of claim 18, wherein the adaptor means further includes means for retrieving supplier information from the ERP system of the enterprise.

21. The software system of claim 20, and further comprising:
means for creating a supplier profile based on the supplier information retrieved from the ERP system of the enterprise.

22. The software system of claim 1, wherein:
the approval rules each include a predicate and a consequence;
the approval path determining means determines whether a particular one of the approval rules applies by applying the predicate to at least one field of the requisition record; and
when the approval path determining means determines that a particular one of the approval rules applies, the approval path determining means determines the approval path with respect to that approval rule by applying the consequence of the approval rule.

23. The software system of claim 1, wherein:
the approval rules database includes an order definition of which approvers approve the requisition serially and which approvers approve the requisition in parallel; and
the approval path handling means operates responsive to the order definition.

24. The system of claim 1, wherein the approval path handling means includes:
notification means, responsive to a position of the requisition record along the approval path, for notifying whichever approver is at that position that action is required to be taken on the requisition.

25. The software system of claim 24, wherein the approval path handling means includes:
status change recognition means that recognizes a change in status of the requisition as a result of action taken by an approver, and
notification means, wherein the notification means operates responsive to the status change recognition means to notify the requestor of the status change.

26. The software system of claim 1, wherein:
the action taken by the approver at a particular position in the approval path includes one of:
approving the requisition; and
denying the requisition; and
the approval path handling means moves the requisition to a next position in the approval path responsive to the approver at the particular position approving the requisition.

27. The software system of claim 26, wherein:
the approval path handling means includes non-response handling means, responsive to an amount of time during which the requisition is at a particular position in the approval path without any action being taken by the approver at that position, for moving the requisition to another approver who has a relationship with the approver who took no action.

28. The software system of claim 27, wherein:
the relationship is indicated by chain of command data defined in an ERP database, and the system further includes an ERP adaptor for accessing the chain of command data from the ERP database.

29. The system of claim 26, and further comprising:
notification means, wherein in response to the requisition being moved to the next position in the approval path, the notification means notifies the approver at said next position that action is required to be taken, by that approver, on the requisition.

30. The software system of claim 26, wherein:
the action taken by the approver at the particular location in the approval path further includes:
modifying at least a portion of the requisition record; and
the approval path handling means includes modification response means, operating in response to an approver modifying a requisition, for causing the approval path determining means to determines a replacement approval path, responsive to the modified requisition.

31. The system of claim 1, wherein the approval path handling means includes non-response handling means, responsive to a request from the requester, for moving the requisition from a first approver who has taken no action to a second approver who has a relationship to the approver who took no action.

32. The system of claim 31, wherein, responsive to moving the request from the first approver, the approval path handling means prevents the first approver from action on the requisition.

33. The system of claim 31, wherein the relationship is at least defined in the approval rules.

34. The system of claim 1, and further including:
delegation of authority means for receiving a request from a first approver for delegating the authority of the first approver to a second approver by configuring the approval path handling means to modify the approval path such that the approval path includes the second approver in place of the first approver.

35. A machine-readable medium having a set of executable instructions to cause a machine to perform a method for facilitating electronic commerce, the method comprising:
querying a user with a plurality of purchasing decision questions via a user interface on a client device, wherein the user is to reply to each question by selecting one or more requisition information selections via the user interface, wherein each question is depended upon a preceding question;
generating automatically an electronic requisition form based on the selected requisition information, the electronic requisition form is delivered to at least one of a plurality of suppliers, the electronic requisition form to include a plurality of line items, each line item describing an item to be ordered;
deciding between at least one of a purchase card module, a direct order module, and a purchase order module to submit the electronic requisition form for fulfillment:
transmitting the electronic requisition form directly to at least one of the plurality of suppliers based on a direct order agreement between a company employing the user and the at least one supplier;
generating an electronic receipt at the client device to electronically indicate an acceptance of at least one of the ordered items; and
facilitating payment for the at least one accepted ordered item by the company based on the electronic receipt.

36. The machine-readable medium of claim 35, further comprising:
presenting additional requisition information selections to be selected by the user via the user interface based on the previously selected requisition information.

37. The machine-readable medium of claim 35, wherein the electronic receipt further indicates a rejection of at least one of the ordered items.

38. The machine-readable medium of claim 35, wherein the selected requisition information includes frequently-ordered items.

39. The machine-readable medium of claim 35, wherein the selected requisition information includes shipping information.

40. The machine-readable medium of claim 35, wherein the transmitting includes transmitting the electronic requisition form directly to the least one of the plurality of suppliers based on a supplier profile stored on the client device.

41. A machine-readable medium having a set of executable instructions to cause a machine to perform a method for facilitating electronic commerce, the method comprising:
generating an electronic requisition form to be electronically delivered to at least one of a plurality of suppliers, the electronic requisition form to include a plurality of line items, each line items describing a item to be ordered;
deciding between at least one of a purchase card module, a direct order module, and a purchase order module to submit the electronic requisition form for fulfillment;
transmitting the electronic requisition form directly to at least one of the plurality of suppliers; and
generating an electronic receipt to electronically indicate a rejection to at least one of the plurality of line items, the electronic receipt to include a comment field to describe the nature of the rejection.

42. The machine-readable medium of claim 41, wherein the electronic receipt further indicates a rejection of all the ordered items.

43. The machine-readable medium of claim 41 further comprising:
notifying a purchasing agent for the company of the at least one rejected ordered item.

44. The machine-readable medium of claim 41, wherein the electronic receipt further indicates an acceptance of at least one ordered item.

45. The machine-readable medium of claim 44 further comprising:
facilitating payment for the at least one accepted ordered item.

* * * * *